US012807497B2

(12) United States Patent
Dixon et al.

(10) Patent No.: US 12,807,497 B2
(45) Date of Patent: *Nov. 24, 2026

(54) METHOD OF FORMING A GRAPHENE LAYER STRUCTURE AND A GRAPHENE SUBSTRATE

(71) Applicant: Paragraf Limited, Somersham (GB)

(72) Inventors: Sebastian Dixon, Somersham (GB); Ivor Guiney, Somersham (GB); Simon Thomas, Somersham (GB); Ross Matthew Griffin, Somersham (GB)

(73) Assignee: Paragraf Limited, Somersham (GB)

( * ) Notice: Subject to any disclaimer, the term of this patent is extended or adjusted under 35 U.S.C. 154(b) by 518 days.

This patent is subject to a terminal disclaimer.

(21) Appl. No.: 18/283,770

(22) PCT Filed: Mar. 22, 2022

(86) PCT No.: PCT/EP2022/057497

§ 371 (c)(1), (2) Date: Sep. 22, 2023

(87) PCT Pub. No.: WO2022/200351

PCT Pub. Date: Sep. 29, 2022

(65) Prior Publication Data

US 2024/0166521 A1 May 23, 2024

(30) Foreign Application Priority Data

Mar. 24, 2021 (GB) .................................... 2104140
Apr. 29, 2021 (GB) .................................... 2106149
May 20, 2021 (GB) .................................... 2107209
Jul. 12, 2021 (GB) .................................... 2110027

(51) Int. Cl.
*C01B 32/186* (2017.01)

(52) U.S. Cl.
CPC ........ *C01B 32/186* (2017.08); *C01P 2002/82* (2013.01); *C01P 2004/04* (2013.01)

(58) Field of Classification Search
CPC . C01B 32/186; C01P 2002/82; C01P 2004/04
See application file for complete search history.

(56) References Cited

U.S. PATENT DOCUMENTS 12,275,640 B2 * 4/2025 Dixon ............... C23C 16/45572
2001/0029092 A1 10/2001 Park et al.
2005/0142715 A1 6/2005 Sakoda et al.
2011/0175060 A1 7/2011 Okai et al.
2012/0181505 A1 7/2012 Lin et al.
2013/0026442 A1 1/2013 Kim
2014/0103213 A1 4/2014 Maliakal et al.
2015/0372159 A1 12/2015 Englund et al.
2018/0284561 A1 10/2018 Phare et al.
2018/0323406 A1 11/2018 Li
2019/0198313 A1 6/2019 Ryou et al.
2020/0124795 A1 4/2020 Cherchi et al.
2020/0149152 A1 5/2020 Park et al.
2022/0267896 A1 8/2022 Glass et al.

FOREIGN PATENT DOCUMENTS

CN 103011136 A 4/2013
CN 103926220 A 7/2014
CN 103954590 A 7/2014
CN 105022178 A 11/2015
CN 105355702 A 2/2016
CN 106024901 A 10/2016
CN 107561028 A 1/2018
CN 108428986 A 8/2018
CN 108873395 A 11/2018
CN 109541820 A 3/2019
CN 110989216 A 4/2020
CN 111180537 A 5/2020
CN 212162092 U 12/2020
CN 112838136 A 5/2021
EP 2584397 A1 4/2013
GB 2515948 A 1/2015
GB 2585842 A 1/2021
JP 2015050434 A 3/2015
WO 2017029470 A1 2/2017

OTHER PUBLICATIONS

Cho, C.-C., et al., "Electrical Properties of Low-Temperature-Grown CaF2 on Si(111)," Jan. 20, 1992, Appl. Phys. Lett., 60(3):338-340, 3 pages.
International Search Report and Written Opinion for PCT/EP2022/057497, dated Sep. 12, 2022, 19 pages.
Combined Search and Examination Report for International Application GB2110027.6, dated Dec. 16, 2021, 9 pages.
Combined Search and Examination Report for GB Application No. GB 2107209.5, dated Oct. 2021, 11 pages.
Examination Report for GB Application No. 2106149.4, dated Aug. 3, 2023, 4 pages.
Combined Search and Examination Report for GB 2106149.4, dated Oct. 19, 2021, 10 pages.
Acurio, Eliana et al. "Reliability in GaN-based devices for power applications," IEEE Third Ecuador Technical Chapters Meeting, 2018, (ETCM), 6 pages.
Akcoltekin, S., et al. "Graphene on insulating crystalline substrates", Nanotechnology, 2009, 11 pages.
Chau, T.K., et al. "Grapene Field-Effect Transistor on a Calcium Fluoride Substrate," Journal of the Korean Physical Society, 2019, vol. 77, No. 10, pp. 879-883.

(Continued)

*Primary Examiner* — Stuart L Hendrickson

(74) *Attorney, Agent, or Firm* — Stinson LLP

(57) ABSTRACT

A method of forming a graphene layer structure, the method comprising: providing a growth substrate having a growth surface; and forming a graphene layer structure on the growth surface by CVD; wherein the growth surface is formed of a material selected from the group consisting of: YSZ, $MgAl_2O_4$, $YAlO_3$, $CaF_2$ and $LaF_3$.

20 Claims, 23 Drawing Sheets

(56) References Cited

OTHER PUBLICATIONS

Chi, Yunsi, et al. "Pristine graphene membranes supported on ceramic hollow fibre prepared via a sacrificial layer assisted CVD approach", Journal of Membrane Science, 2020, No. 595, 8 pages.
Datta et al. "Platform for ultra-strong modulation in hybrid silicon nitride/2D material photonic structures", Department of Electrical Engineering and Department of Mechanical Engineering, 2020, Columbia University, New York, NY., 2 pages.
Hu, H., et al. "Far-field nanoscale infrared spectroscopy of vibrational fingerprints of molecules with graphene plasmons", Nature Communications, 2016, No. 7:12334, 8 pages.
Joshi, S, et al. "Transition metal dichalcogenides integrated waveguide modulator and attenuator in silicon nitride platform", Nanotechnology, 2020, No. 31, 435202, 9 pages.
Karamat, S., et al. "Growth of nano-graphene on SrTiO3 (110) substrates by chemical vapour deposition", Materials Chemistry and Physics , 2017, No. 200, pp. 187-195.
Klar, P., et al. "Raman scattering efficiency of graphene", Physical Review, 2013, No. 87, pp. 205435-205435-11.
Naiini, Maziar M., et al. "Embedded graphene photodetectors for silicon photonics," 72nd Device Research Conference, 2014, IEEE, pp. 43-44.
Park, Dong-Wook, et al. "Bottom-gate coplanar graphene transistors with enhanced graphene adhesion on atomic layer deposition Al2O3", Applied Physics Letters, 2015, No. 106, pp. 102106-1-1021011-1.
Sorianello, Vita, et al. "Graphene on Silicon Modulators", Journal of Lightwave Technology, 2020, vol. 38, No. 10, pp. 2782-2789.
Sorianello, Vita, et al. "Graphene Phase Modulator", Nature Photonics, 2017, No. 12, 7 pages.
Wirtz, Christian, et al. "Growth optimisation of high quality graphene from ethene at low temperatures", Chemical Physics Letters, 2014, No. 595-596, pp. 192-196.
Zeller, P., et al. "Detachment of CVD-grown graphene from single crystalline Ni films by a pure gas phase reaction", Surface Science, 2016, No. 653, pp. 143-152.
Combined Search and Examination Report for GB2104140.5, dated Aug. 26, 2021, 7 pages.

* cited by examiner

METHOD OF FORMING A GRAPHENE LAYER STRUCTURE AND A GRAPHENE SUBSTRATE

REFERENCE TO RELATED APPLICATIONS

This application is the 371 U.S. National Stage application of International Patent Application No. PCT/EP2022/057497, filed Mar. 22, 2022, which claims the benefit of United Kingdom Patent Application No. 2104140.5, filed Mar. 24, 2021; United Kingdom Patent Application No. 2106149.4, filed Apr. 29, 2021; United Kingdom Patent Application No. 2107209.5, filed May 20, 2021; and United Kingdom Patent Application No. 2110027.6, filed Jul. 12, 2021, the entire disclosures of which are incorporated herein by reference.

The present invention relates to a method of forming a graphene layer structure, in particular by CVD on specific growth surfaces of substrates. In a particularly preferred aspect of the present invention, the growth surface is formed of yttrium stabilised zirconium oxide (yttria stabilised zirconia; YSZ). The present invention also provides a graphene substrate, in particular wherein a graphene layer structure is directly on a specific layer of material, preferably, YSZ.

Graphene has received much attention as a two-dimensional material in view of its unique electronic properties and its applications in electronic devices. It is common in the art for graphene to be manufactured by techniques such as exfoliation or by CVD on catalytic metal substrates such as copper. The graphene produced by such methods is then transferred to electronic device compatible, insulative or semiconducting substrates.

It is also known in the art that graphene may be synthesised, manufactured, formed, directly on non-metallic surfaces of substrates. These include silicon, sapphire and III-V semiconductor substrates. The present inventors have found that the most effective method for manufacturing high-quality graphene, especially directly on such non-metallic surfaces, is that disclosed in WO 2017/029470, as well as GB 2585842. This publication discloses methods for manufacturing graphene; principally these rely on heating a substrate held within a reaction chamber to a temperature that is within a decomposition range of a carbon based precursor for graphene growth, introducing the precursor into the reaction chamber through a relatively cool inlet so as to establish a sufficiently steep thermal gradient that extends away from the substrate surface towards the point at which the precursor enters the reaction chamber such that the fraction of precursor that reacts in the gas phase is low enough to allow the formation of graphene from carbon released from the decomposed precursor. Preferably the apparatus comprises a showerhead having a plurality of precursor entry points or inlets, the separation of which from the substrate surface may be varied and is preferably less than 100 mm. The method of WO 2017/029470 is ideally performed using an MOCVD reactor. Whilst MOCVD stands for metal organic chemical vapour deposition due to its origins for the purposes of manufacturing semiconductor materials such as AlN and GaN from metal organic precursors such as $AlMe_3$ (TMAl) and $GaMe_3$ (TMGa), such apparatus and reactors are well known and understood to those skilled in the art as being suitable for use with non-metal organic precursors. MOCVD may be used synonymously with metal organic vapour phase epitaxy (MOVPE).

Whilst the method of WO 2017/029470 enables the production of high-quality graphene with excellent uniformity and a constant number of layers (as desired) across its whole area on the substrate without additional carbon fragments or islands, the strict requirements in the art of electronic device manufacture means that there remains a need to further improve the electronic properties of the graphene and to provide methods that are more reliable and more efficient for the industrial manufacture of graphene, particularly large area graphene on non-metallic substrates. US 2012/181505 A1 discloses forming a carbon-based material on a substrate comprising calcium fluoride.

CN 105355702 B discloses transferring graphene grown by CVD onto a dielectric layer.

Karamat et al. "Growth of nano-graphene on $SrTiO_3$ (110) substrates by chemical vapour deposition" *Materials Chemistry and Physics* 2017, 200, 187-195 discloses growth of multilayer nanographene domains on $SrTiO_3$.

US 2018/0323406 A1 discloses growth of graphene by CVD on a metal film of a substrate or by growth on a metal foil substrate and transferring graphene.

CN 212162092 U relates to a tuneable terahertz absorber and teaches using photolithographic exposure techniques to fabricate a graphene pattern and deposit a graphene layer.

The present inventors sought to overcome the problems in the prior art and were surprised to find that particular non-metallic materials provide superior growth surfaces for the formation of high quality graphene and graphene substrates suitable for use in electronic device fabrication.

In accordance with a first aspect of the present invention, there is provided a method of forming a graphene layer structure, the method comprising:

- providing a growth substrate having a growth surface; and
- forming a graphene layer structure on the growth surface by CVD;
- wherein the growth surface is formed of a material selected from the group consisting of: YSZ, $MgAl_2O_4$, $YAlO_3$, $CaF_2$, and $LaF_3$.

In a further aspect there is provided a graphene substrate comprising:

- a CVD-grown graphene layer structure grown directly on a first layer,
- wherein the first layer is formed of a material selected from the group consisting of: YSZ, $MgAl_2O_4$, $YAlO_3$, $CaF_2$ and $LaF_3$.

The present disclosure will now be described further. In the following passages, different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

The present invention relates to a method of forming a graphene layer structure by CVD growth of graphene on a growth surface of a substrate (which may be referred to as a growth substrate). The method thereby forms a graphene substrate and accordingly, the present invention also provides a graphene substrate per se. Forming may be considered synonymous with synthesising, manufacturing, producing and growing. Graphene is a very well-known two-dimensional material referring to an allotrope of carbon comprising a single layer of carbon atoms in a hexagonal lattice. Graphene, as used herein, refers to one or more layers of graphene. Accordingly, the present invention relates to the formation of a monolayer of graphene as well as multilayer graphene (which may be termed a graphene layer structure). Graphene, as used herein, refers to a graphene layer structure, preferably having from 1 to 10 monolayers of graphene. In many subsequent applications of a graphene substrate, one monolayer of graphene is particularly preferred. Accordingly, the graphene layer structure is preferably a graphene monolayer. Nevertheless, multilayer graphene may be preferable for certain applications and 2 or 3 layers of graphene may be preferred. As described herein, the method of forming a graphene layer structure comprises forming graphene by CVD directly onto specific growth surfaces.

A graphene substrate will be understood as a substrate comprising graphene and suitable for subsequent use. Particularly, the graphene substrate is suitable for use in preparing graphene based electronic devices. As used herein, the term substrate may be used to refer to a material suitable for the deposition of another layer thereon. The term substrate is typically synonymous with a wafer. Accordingly, each of the support layer and metal oxide can each independently be referred to as a substrate.

The method comprises providing a growth substrate having a growth surface. Substrates suitable for the growth of layers on their surface are well known. Substrates may also be referred to in the art as wafers and may consist of a single material or layers of multiple materials. As will be appreciated, a substrate, and a growth surface thereof, is formed of crystalline material as is known in the art. Accordingly, substrates and wafers provide a planar growth surface, preferably formed of a single crystal, and do not include powders or nano-crystalline materials. Typically, substrates have a diameter of at least 1 inch (25 mm), preferably at least 2 inches (51 mm).

The growth substrate for use in the present method is provided with a growth surface wherein the growth surface is formed of a material selected from the group consisting of: yttrium stabilised zirconium oxide (YSZ), magnesium aluminate ($MgAl_2O_4$), yttrium aluminium perovskite ($YAlO_3$ or YAP), calcium difluoride ($CaF_2$) and lanthanum trifluoride ($LaF_3$). In one embodiment, the growth substrate consists of one of said materials. Preferably, the thickness of the substrate is at least 250 μm, preferably at least 400 μm. However, preferably, the growth substrate further comprises a support layer which preferably comprises silicon or sapphire. As will be appreciated, a silicon support layer, for example, includes a "pure" silicon wafer (essentially consisting of silicon, doped or undoped) or what may be referred to as a CMOS wafer which includes additional associated circuitry. The thickness of the material used to form the growth surface of such a substrate may be much thinner. Preferably, the thickness is at least 5 nm, preferably at least 10 nm. The upper limit is not particularly restricted though a "thin film" growth surface provided on a support substrate is generally less than 50 μm thick, such as less than 10 μm or even less than 5 μm.

The present inventors found that growth surfaces for the formation of graphene by CVD being made of YSZ, $MgAl_2O_4$, $YAlO_3$, $CaF_2$ or $LaF_3$ were surprisingly advantageous. Without wishing to be bound by theory, the inventors believe that these materials may have a low carbon solubility at high temperatures (relative to known growth substrate materials) such that during the high temperatures of CVD, high-quality uniform graphene may be grown without the defects which can be present when grown directly on other known growth surfaces. For example, it is known that growth surfaces formed of materials such as silicon or III-V semiconductors can give rise to covalent bonding to the carbon atoms during growth resulting in graphene defects. Accordingly, the use of the materials described herein provides advantages for CVD grown graphene in terms of the resulting electronic properties, i.e. improved mobility, sheet resistance and Hall sensitivity.

As will be appreciated, the stoichiometries of the materials need not be precise. As is known in the art, the stoichiometry of such materials may vary. In particular, it is known that the oxygen stoichiometry may vary. By way of example only, magnesium aluminate, may be referred to as $MgAl_2O_x$ wherein x is about 4.

Preferably, the growth surface is formed of a material selected from the group consisting of YSZ, $MgAl_2O_4$, $YAlO_3$, and $CaF_2$, even more preferably from the group consisting of YSZ, $YAlO_3$, and $CaF_2$. It is preferred that the growth surface is formed of YSZ or $CaF_2$ as the inventors have found that these materials were surprisingly the most effective of those of the present invention in providing high quality graphene by CVD. It is particularly preferred that the growth surface is formed of YSZ. The crystallographic orientation of the YSZ or the $CaF_2$ growth surface may preferably be <100>, <110>, or <111>, more preferably <100> or <111>, and most preferably <111>.

CVD refers generally to a range of chemical vapour deposition techniques, each of which involve vacuum deposition to produce thin film materials such as two-dimensional crystalline materials like graphene. Volatile precursors, those in the gas phase or suspended in a gas, are decomposed to liberate the necessary species to form the desired material, carbon in the case of graphene. CVD as described herein is intended to refer to thermal CVD such that the formation of graphene from the decomposition of a carbon-containing precursor is the result of the thermal decomposition of said carbon-containing precursor.

Preferably, the method involves forming graphene by thermal CVD such that decomposition is a result of heating the carbon-containing precursor. Preferably, the temperature of the growth surface during CVD is from 700° C. to 1350° C., preferably from 800° C. to 1250° C., more preferably from 1000° C. to 1250° C. The inventors have found that such temperatures are particularly effective for providing graphene growth directly on the materials described herein by CVD. Preferably, the CVD reaction chamber used in the method disclosed herein is a cold-walled reaction chamber wherein a heater coupled to the substrate is the only source of heat to the chamber.

In a particularly preferred embodiment, the CVD reaction chamber comprises a close-coupled showerhead having a plurality, or an array, of precursor entry points. Such CVD apparatus comprising a close-coupled showerhead may be known for use in MOCVD processes. Accordingly, the method may alternatively be said to be performed using an MOCVD reactor comprising a close-coupled showerhead. In either case, the showerhead is preferably configured to provide a minimum separation of less than 100 mm, more preferably less than 25 mm, even more preferably less than 10 mm, between the surface of the substrate and the plurality of precursor entry points. As will be appreciated, by a constant separation it is meant that the minimum separation between the surface of the substrate and each precursor entry point is substantially the same. The minimum separation refers to the smallest separation between a precursor entry point and the substrate surface (i.e. the surface of the metal oxide layer). Accordingly, such an embodiment involves a "vertical" arrangement whereby the plane containing the precursor entry points is substantially parallel to the plane of the substrate surface (i.e. the growth surface).

The precursor entry points into the reaction chamber are preferably cooled. The inlets, or when used, the showerhead, are preferably actively cooled by an external coolant, for example water, so as to maintain a relatively cool temperature of the precursor entry points such that the temperature of the precursor as it passes through the plurality of precursor entry points and into the reaction chamber is less than 100° C., preferably less than 50° C. For the avoidance of doubt, the addition of precursor at a temperature above ambient does not constitute heating the chamber, since it would be a drain on the temperature in the chamber and is responsible in part for establishing a temperature gradient in the chamber.

Preferably, a combination of a sufficiently small separation between the substrate surface and the plurality of precursor entry points and the cooling of the precursor entry points, coupled with the heating of the substrate to with a decomposition range of the precursor, generates a sufficiently steep thermal gradient extending from the substrate surface to the precursor entry points to allow graphene formation on the substrate surface. As disclosed in WO 2017/029470, very steep thermal gradients may be used to facilitate the formation of high-quality and uniform graphene directly on non-metallic substrates, preferably across the entire surface of the substrate. The substrate may have a diameter of at least 5 cm (2 inches), at least 15 cm (6 inches) or at least 30 cm (12 inches). Particularly suitable apparatus for the method described herein include an Aixtron® Close-Coupled Showerhead® reactor and a Veeco® TurboDisk reactor.

Consequently, in a particularly preferred embodiment wherein the method of the present invention involves using a method as disclosed in WO 2017/029470, forming the graphene layer structure on the growth surface by CVD comprises:

- providing the growth substrate on a heated susceptor in a close-coupled reaction chamber, the close-coupled reaction chamber having a plurality of cooled inlets arranged so that, in use, the inlets are distributed across the growth surface and have constant separation from the substrate;
- cooling the inlets to less than 100° C. (i.e. so as to ensure that the precursor is cool as it enters the reaction chamber);
- introducing a carbon-containing precursor in a gas phase and/or suspended in a gas through the inlets and into the close-coupled reaction chamber; and
- heating the susceptor to achieve a growth surface temperature of at least 50° C. in excess of a decomposition temperature of the precursor, to provide a thermal gradient between the substrate surface and inlets that is sufficiently steep to allow the formation of graphene from carbon released from the decomposed precursor;
- wherein the constant separation is less than 100 mm, preferably less than 25 mm, even more preferably less than 10 mm.

The most common carbon-containing precursor in the art for graphene growth is methane ($CH_4$). The inventors have found that it is preferable that the carbon-containing precursor used to form graphene is an organic compound, that is, a chemical compound, or molecule, that contains a carbon-hydrogen covalent bond, which comprises two or more carbon atoms. Such precursors have a lower decomposition temperature than methane which advantageously allows the growth of graphene at lower temperatures when using the method described herein which is particularly advantageous for growth on such non-metallic surfaces. Preferably, the precursor is a liquid when measured at 20° C. and 1 bar of pressure (i.e. under standard conditions according to IUPAC). Accordingly, the precursor has a melting point that is below 20° C., preferably below 10° C., and has a boiling point above 20° C., preferably above 30° C. Liquid precursors are simpler to store and handle when compared to gaseous precursors which typically require high pressure cylinders. Due to their relatively reduced volatility when compared to gaseous precursors, they present a lower safety risk during large scale manufacture. Increasing the molecular weight of the compounds beyond about $C_{10}$, particularly beyond about $C_{12}$, typically reduces their volatility and suitability for CVD growth of graphene on non-metallic substrates (though graphene can be produced from solid organic compounds). Preferably, the organic compound consists of carbon and hydrogen and, optionally, oxygen, nitrogen, fluorine, chlorine and/or bromine.

As discussed above, the method described herein preferably uses a carbon-containing precursor that is an organic compound comprising two of more carbon atoms, i.e. a $C_{2+}$ organic compound. Preferably, the carbon-containing precursor is a $C_3$-$C_{12}$ organic compound consisting of carbon and hydrogen and, optionally, oxygen, nitrogen, fluorine, chlorine and/or bromine. As described herein, a Cn organic compound refers to one comprising "n" carbon atoms and optionally one or more further hetero atoms oxygen, nitrogen, fluorine, chlorine and/or bromine. Preferably, the organic compound comprises at most one heteroatom as such organic compounds are typically more readily available in high purity, for example ethers, amines, and haloalkanes.

The carbon-containing precursor is preferably a $C_3$-$C_{10}$ organic compound consisting of carbon and hydrogen and, optionally, oxygen, nitrogen, fluorine, chlorine and/or bromine, even more preferably a $C_6$-$C_9$ organic compound. In a preferred embodiment, the precursor does not comprise a heteroatom, such that the precursor consists of carbon and hydrogen. In other words, preferably the carbon-containing precursor is a hydrocarbon, preferably an alkane.

It is also preferable that the organic compound comprise at least two methyl groups (—$CH_3$). Particularly preferred organic compounds for use as carbon-containing precursors, and methods of forming graphene therefrom by CVD, are described in UK Patent Application No. 2103041.6, the contents of which is incorporated herein in its entirety. The inventors have found that when forming graphene directly on non-metallic substrates, precursors beyond the traditional hydrocarbons methane and acetylene allow for the formation of even higher quality graphene. Preferably, the precursor is a $C_4$-$C_{10}$ organic compound, more preferably the organic compound is branched such that the organic compound at least three methyl groups.

Without wishing to be bound by theory, the inventors believe that heavier organic compounds (i.e. those greater than $C_{12}$, or greater than $C_{10}$, and/or those which are solid under standard conditions) provide a "less pure" source of $CH_3$ radicals. With an increase in size and complexity of the organic compound there is an increase in the number of decomposition pathways and the possibility of a greater range of byproducts which can lead to graphene defects. The organic compounds as described herein provide a balance of being large enough to deliver the required, and a desirably high fraction of, methyl groups under pyrolysis. The organic compounds are however small enough to be simple to purify, particularly where the precursor is liquid, and have a relatively simple pyrolysis chemistry with limited decomposition pathways. Furthermore, unlike heavier compounds, they do not so readily condense within the reactor plumbing which is a particular disadvantage for the industrial production of graphene due to the greater risk of reactor downtime.

The present invention also provides a graphene substrate comprising a CVD-grown graphene layer structure grown directly on a first layer, the first layer formed of a material selected from the group consisting of YSZ, $MgAl_2O_4$, $YAlO_3$, $CaF_2$ and $LaF_3$. That is, preferably, the graphene substrate is obtainable, more preferably obtained, by the method disclosed herein. The graphene being that grown directly on the specific materials disclosed herein by CVD therefore avoids physical transfer processing. The physical transfer of graphene, usually from copper substrates, introduces numerous defects which negatively impacts the physical and electronic properties of graphene. As such, a person skilled in the art can readily ascertain whether a graphene layer structure, and by extension a graphene substrate as described herein, is one comprising a CVD-grown graphene layer structure that has been grown directly on the specific materials using conventional techniques in the art such as atomic force microscopy (AFM), energy dispersive X-ray (EDX) spectroscopy, X-ray photoelectron spectroscopy (XPS) and preferably time-of-flight secondary ion mass spectrometry (ToF-SIMS). The graphene layer structure is devoid of copper contamination and devoid of transfer polymer residues by virtue of the complete absence of these materials in the process of obtaining the graphene substrate. Furthermore, such processing is not suitable for large scale manufacture (such as on CMOS substrates in fabrication plants). Unintentional doping, particularly from the catalytic metal substrates together with the etching solutions, also results in the production of graphene which is not sufficiently consistent from sample to sample as is required for commercial production.

Accordingly, it is preferred that first layer is formed of a material selected from the group consisting of YSZ, $MgAl_2O_4$, $YAlO_3$, and $CaF_2$, more preferably from the group consisting of YSZ, $YAlO_3$, and $CaF_2$. Even more preferably, the first layer is YSZ or $CaF_2$, preferably YSZ. Preferably, the first layer is directly on a support layer, preferably wherein the support layer comprises sapphire or silicon.

It is preferred that the growth surface is formed of YSZ or $CaF_2$ as the inventors have found that these materials were surprisingly the most effective of those of the present invention in providing high quality graphene by CVD. It is particularly preferred that the growth surface is formed of YSZ. The crystallographic orientation of the YSZ or the $CaF_2$ growth surface may preferably be <100>, <110>, or <111>, more preferably <100> or <111>. Specifically, the inventors were surprised to find that the growth mechanism of graphene by CVD differed for various substrate orientations which unexpectedly gave rise to different improvements in the graphene properties.

Advantageously, <100> and <111> of YSZ produced graphene having particularly beneficial electrical properties resulting from the combination of mobility and charge carrier density which the inventors found were correlated with the ratio of the peak areas $A_{2D}$ to $A_G$ in the Raman spectrum of the graphene. A higher ratio is indicative of the reduced "substrate interaction" with the graphene layer structure. Accordingly, it is preferred that the ratio $A_{2D}/A_G$ of the graphene layer structure as measured by Raman spectroscopy is greater than 3, preferably greater than 3.5, more preferably greater than 4. On the other hand, <110> was unexpectedly advantageous in that graphene having a lower charge carrier density is formed when compared to growth on <100> and <111>. It is also preferred that the ratio $A_D/A_G$ is less than 0.8, preferably less than 0.6, more preferably less than 0.4.

Furthermore, the inventors were surprised to find that the doping type of the graphene may be influenced by the substrate orientation. $CaF_2$ having a crystallographic orientation of <100> or <110> was found to provide n-type graphene, whereas $CaF_2$ having a crystallographic orientation of <111> was found to provide p-type graphene. Moreover, $CaF_2$ <111> gave rise to graphene having higher mobility than <100> or <110> and a higher $A_{2D}/A_G$ ratio resulting from the reduced substrate interaction. This was evidenced by the greater wrinkle density of graphene grown on the <100> face of $CaF_2$ (relative to the diagonal of <111>). The cubic influence of the substrate can be seen in the wrinkle pattern in FIGS. 2B and 13B. However, graphene grown on $CaF_2$ <100> unexpectedly had markedly lower sheet resistance than graphene grown on <110> or <111>.

In accordance with a further aspect of the present invention, there is provided an electrical device comprising the graphene substrate as described herein. As will be appreciated, the graphene layer structure of the graphene substrate may be patterned using known techniques and electrical contacts may be provided so as to enable the substrate to be incorporated into an electrical device. That is, an electrical device may be manufactured from a graphene substrate thereby incorporating a graphene layer structure directly on a metal oxide layer, said metal oxide layer optionally directly on a support layer as described herein. Further steps for forming electrical devices are known in the art and may include patterning, such as by photolithography, laser and/or plasma etching, and/or deposition of additional layers and materials such as dielectric layers and/or metal ohmic contacts. The electrical device may be diced from an array of devices formed simultaneously from a larger graphene substrate.

An electrical device comprising such a graphene substrate (i.e. comprising graphene grown directly on a first layer) may be improved over prior art devices in view of the advantageous properties afforded by the graphene, in particular an improvement in carrier mobility. For example, an electro-optic modulator is one preferred electrical device which may benefit from greater carrier mobility. In particular, an electro-optic modulator comprising the graphene substrate may operate with greater bandwidth. Other preferred electric devices include transistors (i.e. graphene transistors) such as radio frequency graphene field effect transistors (RF GFETs) which rely on high carrier mobilities to switch "on" and "off" at such high frequencies. Biosensors are also preferred electrical devices which benefit from the higher mobility of graphene due to the associated reduction in sheet resistance which reduces the power required for operation. Another particularly preferred electrical device is a Hall effect sensor. The sensitivity of such devices may be improved with higher carrier mobilities.

The inventors have also found that graphene may be grown by CVD on a substrate having a growth surface formed of magnesium oxide (MgO), strontium titanate ($SrTiO_3$) or yttrium aluminium garnet ($Y_3Al_5O_{12}$ or YAG). Other preferred fluorides include magnesium difluoride ($MgF_2$) or barium difluoride ($BaF_2$). Accordingly, there is also described herein a graphene substrate comprising a graphene layer structure directly on a first layer, wherein the first layer is formed of MgO, $SrTiO_3$, YAG, $MgF_2$ or $BaF_2$. In these instances, all passages of the description herein which refer to YSZ, $MgAl_2O_4$, $YAlO_3$, $CaF_2$ and $LaF_3$ should be construed as applying equally for MgO, $SrTiO_3$, YAG, $MgF_2$ and $BaF_2$.

FIGURES

The present invention will now be described further with reference to the following non-limiting Figures, in which.

EXAMPLES

Figure 1A:
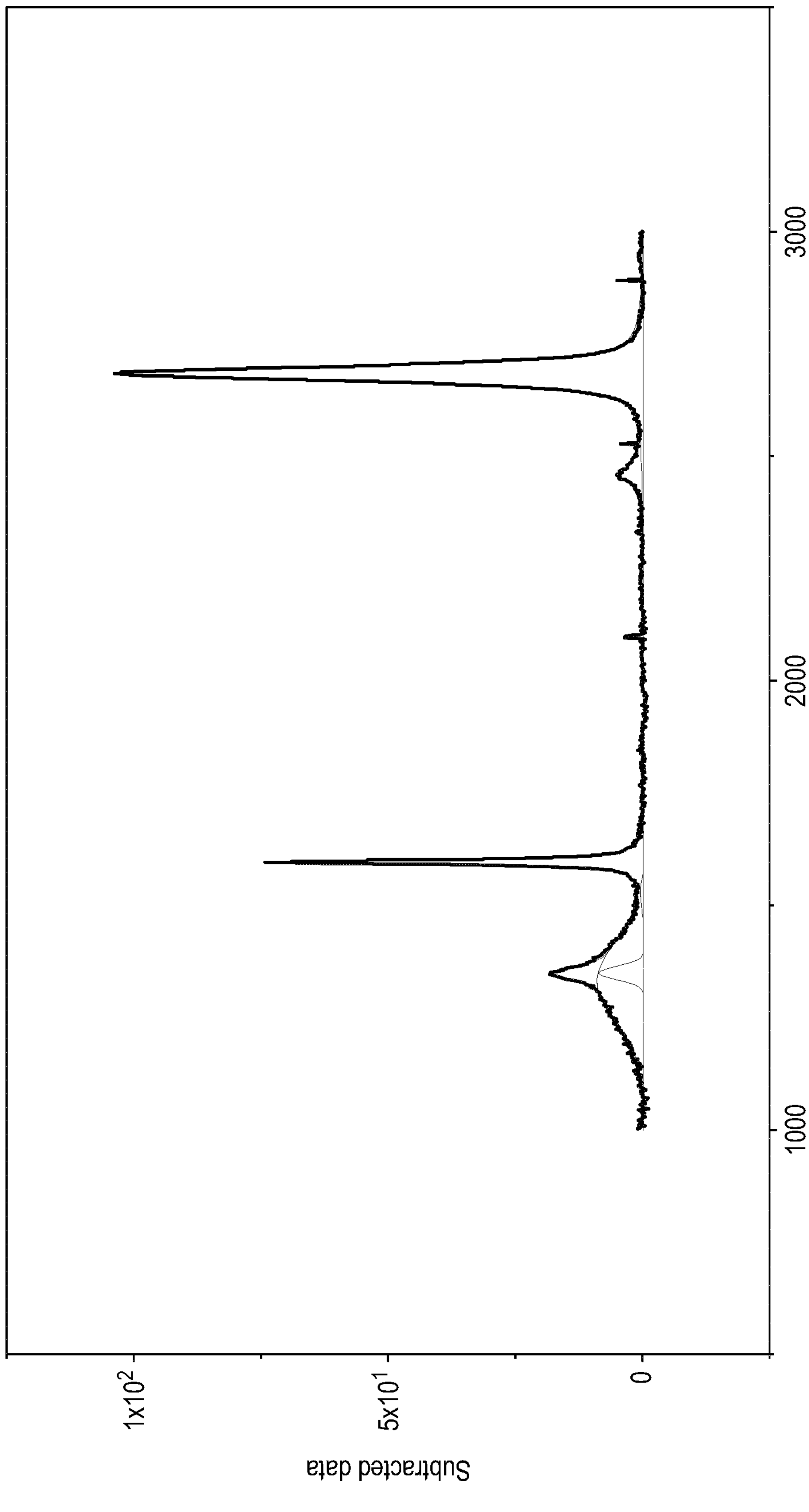
FIG. 1A is a Raman spectrum of graphene grown on a substrate having a YSZ growth surface.
Figure 1B:
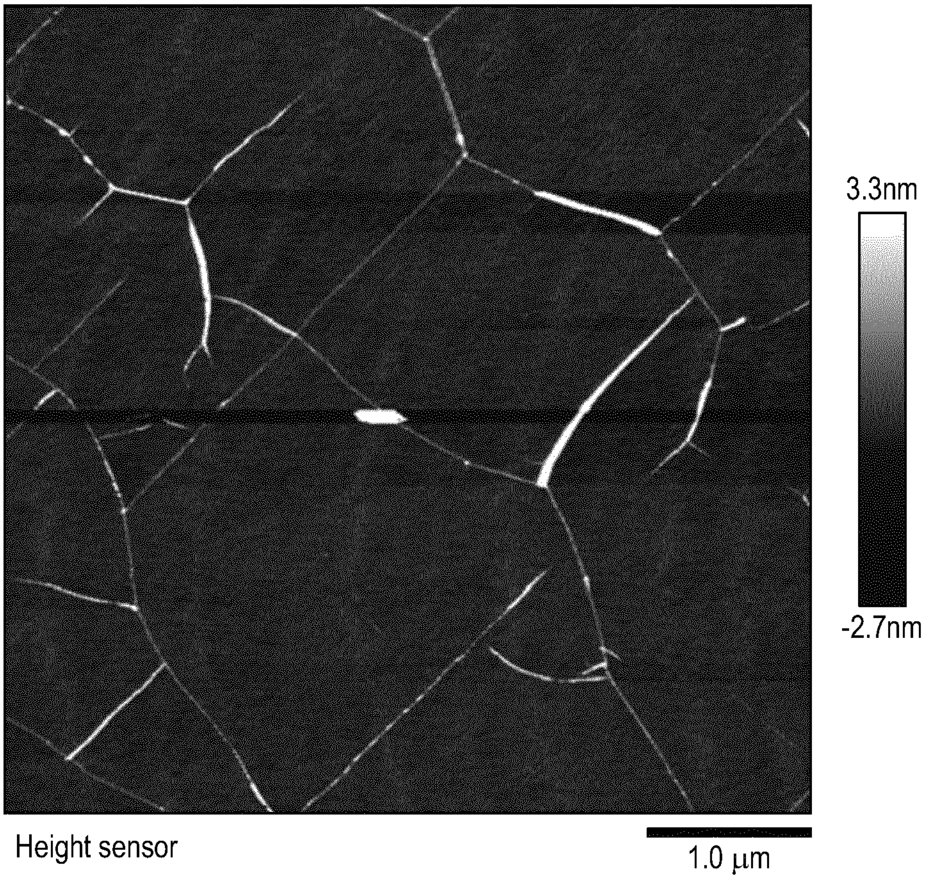
FIG. 1B is an AFM image of the graphene on YSZ.
Figure 2A:
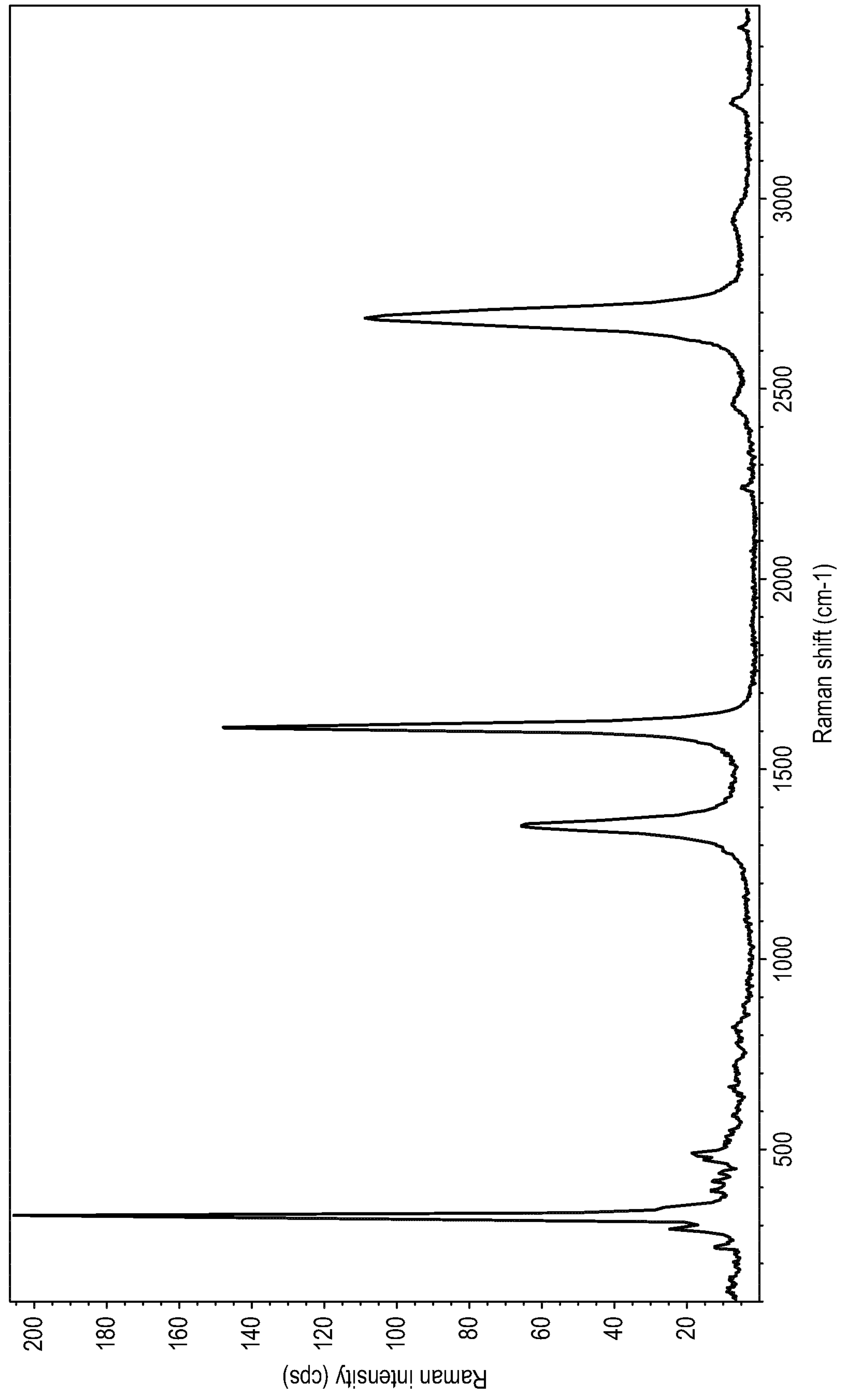
FIG. 2A is a Raman spectrum of graphene grown on a substrate having a $CaF_2$ growth surface.
Figure 2B:
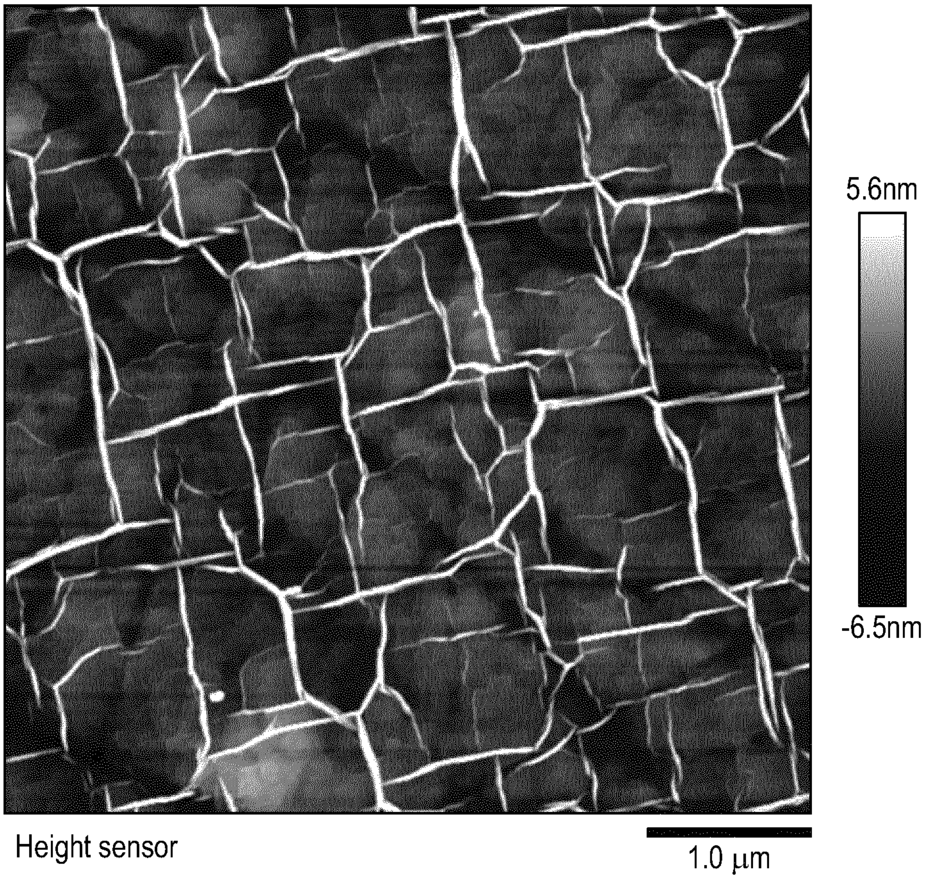
FIG. 2B is an AFM image of the graphene on $CaF_2$.
Figure 3A:
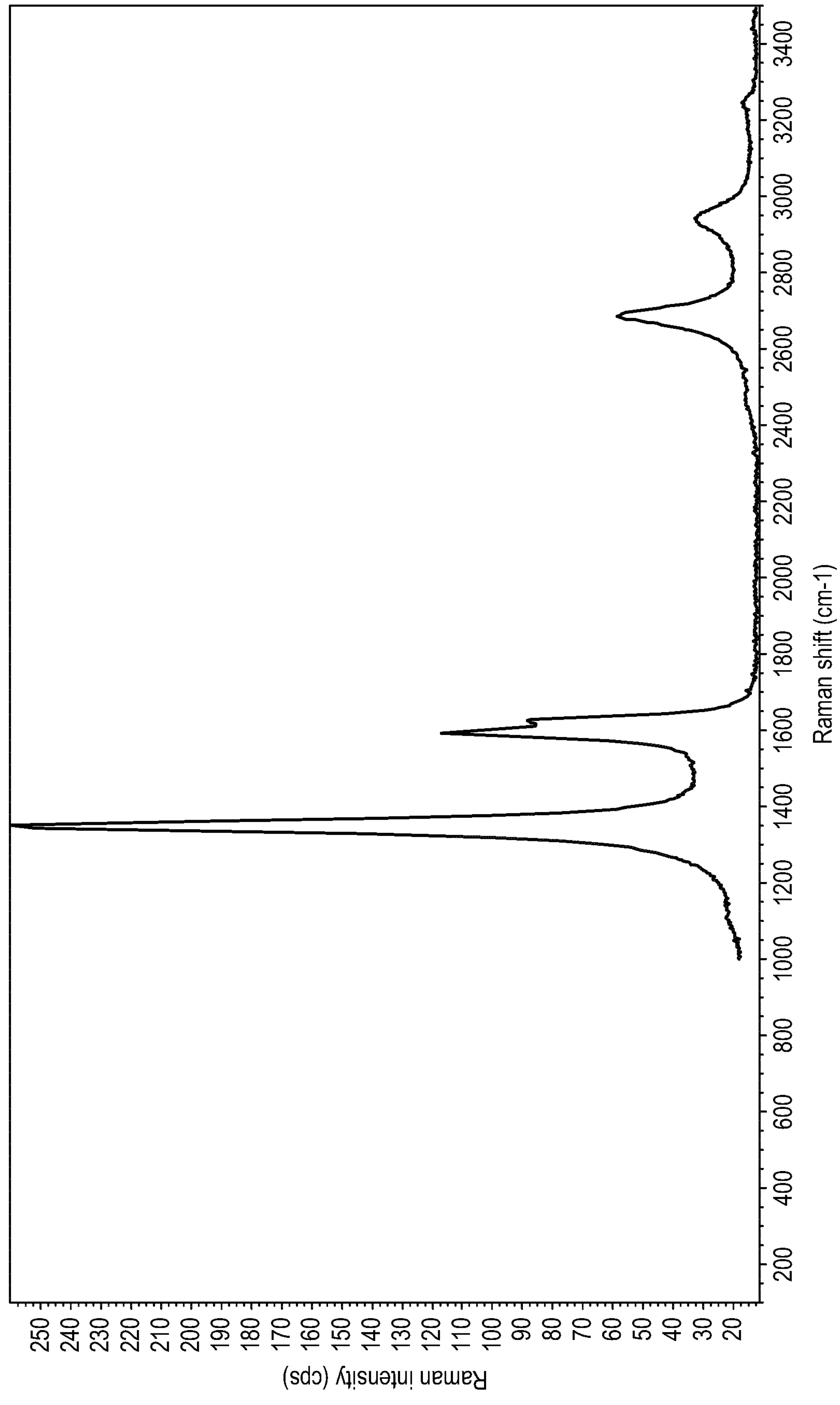
FIG. 3A is a Raman spectrum of graphene grown on a substrate having a $YAlO_3$ growth surface.
Figure 3B:
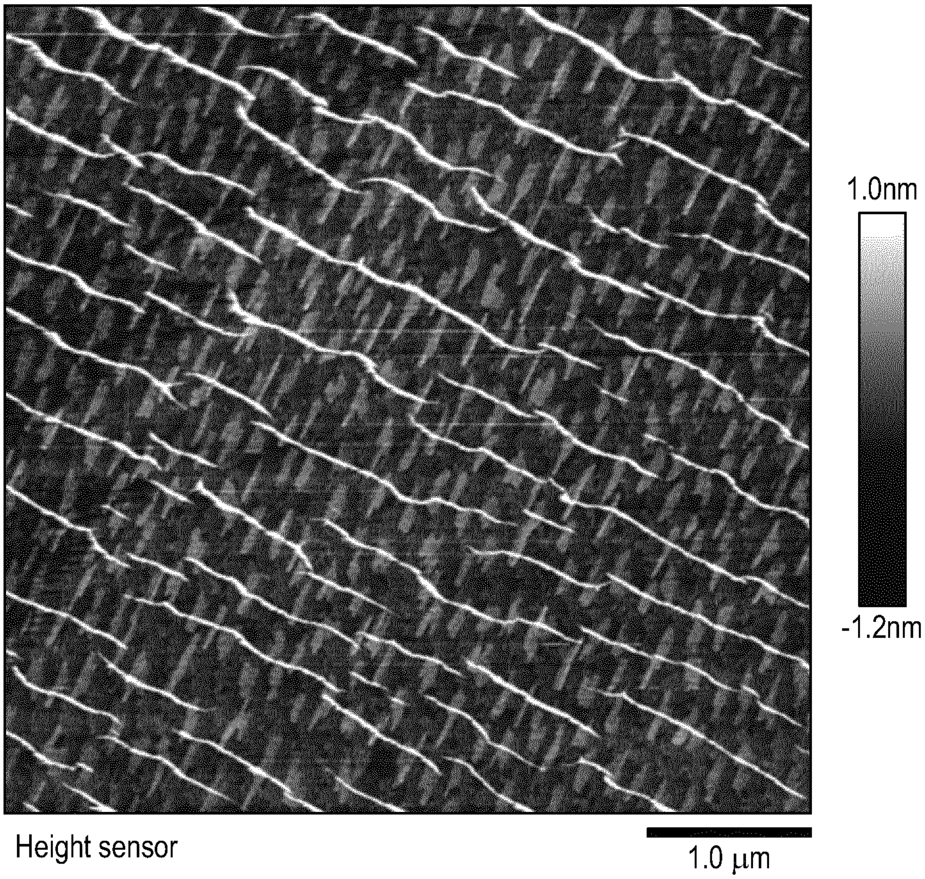
FIG. 3B is an AFM image of the graphene on $YAlO_3$.
Figure 4A:
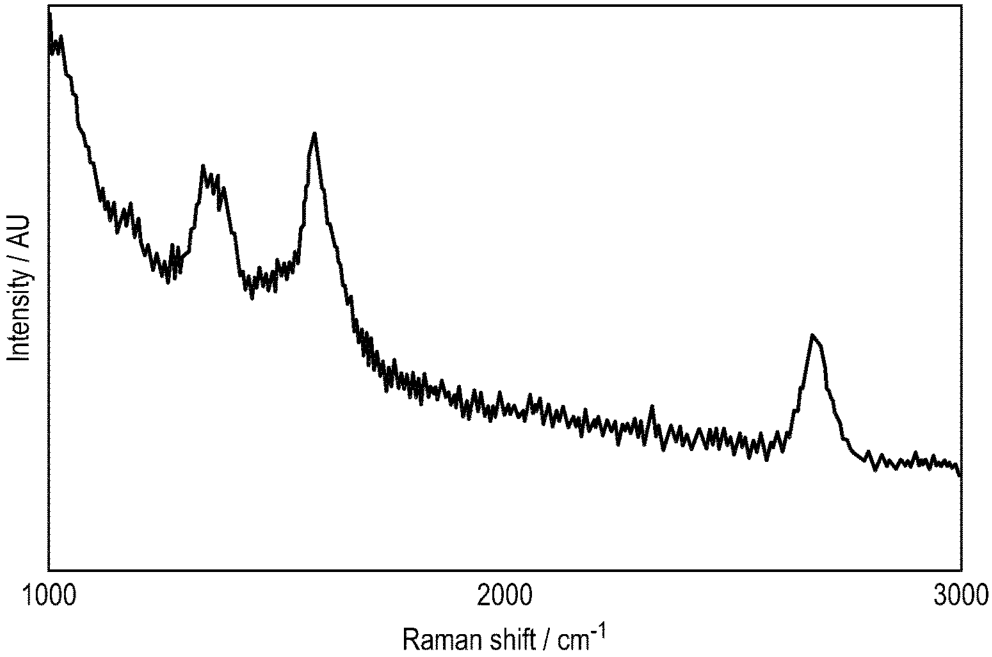
FIG. 4A is a Raman spectrum of graphene grown on a substrate having an $SrTiO_3$ growth surface.
Figure 4B:
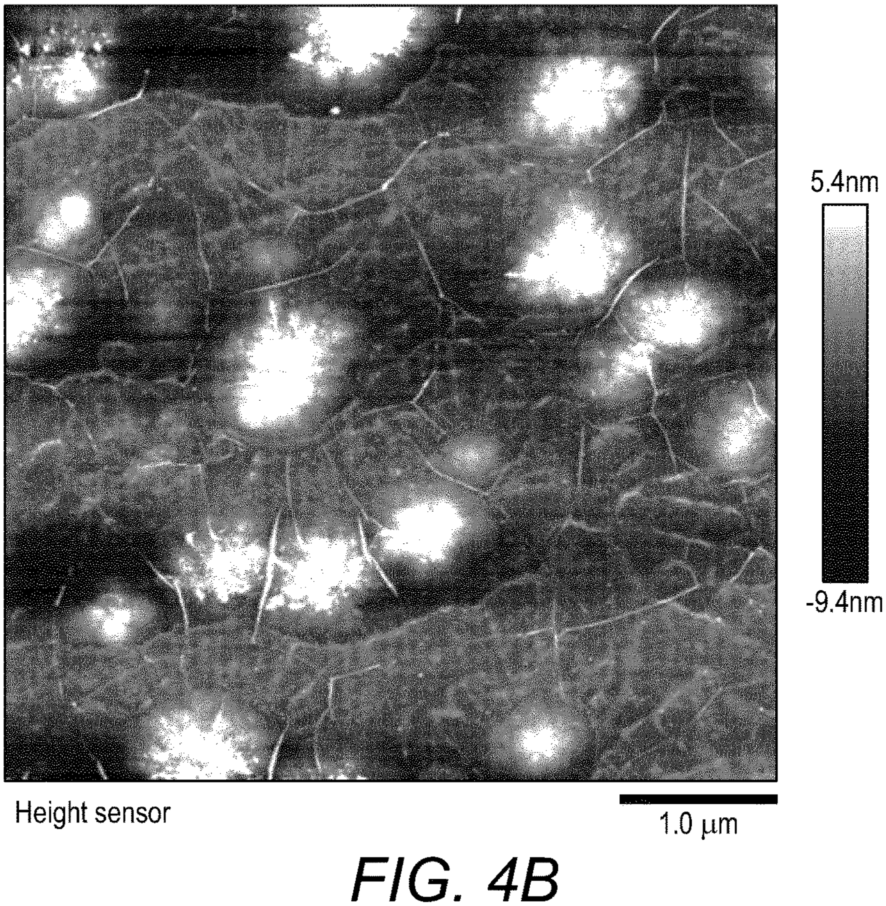
FIG. 4B is an AFM image of the graphene on $SrTiO_3$.
Figure 5A:
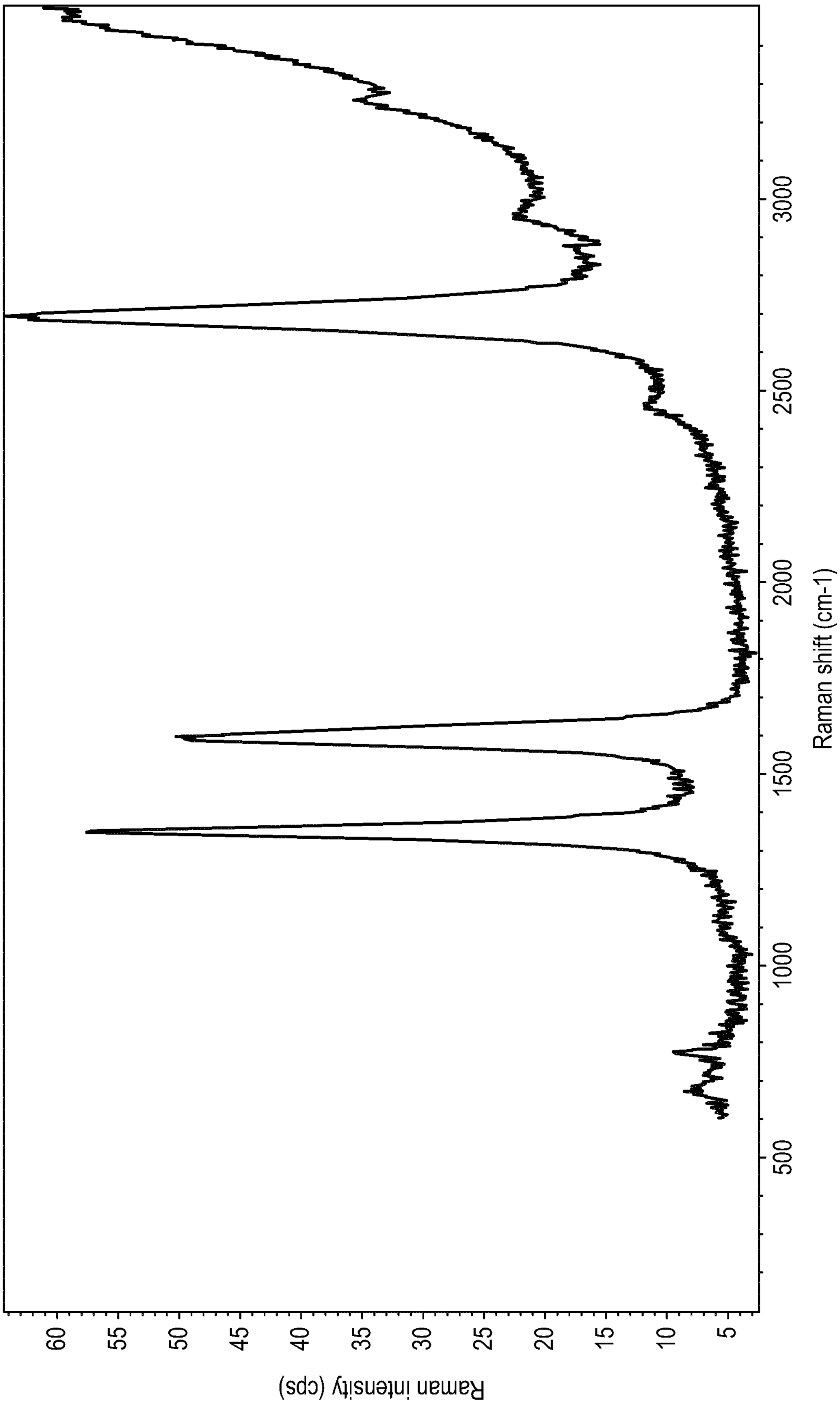
FIG. 5A is a Raman spectrum of graphene grown on a substrate having an $MgAl_2O_4$ growth surface.
Figure 5B:
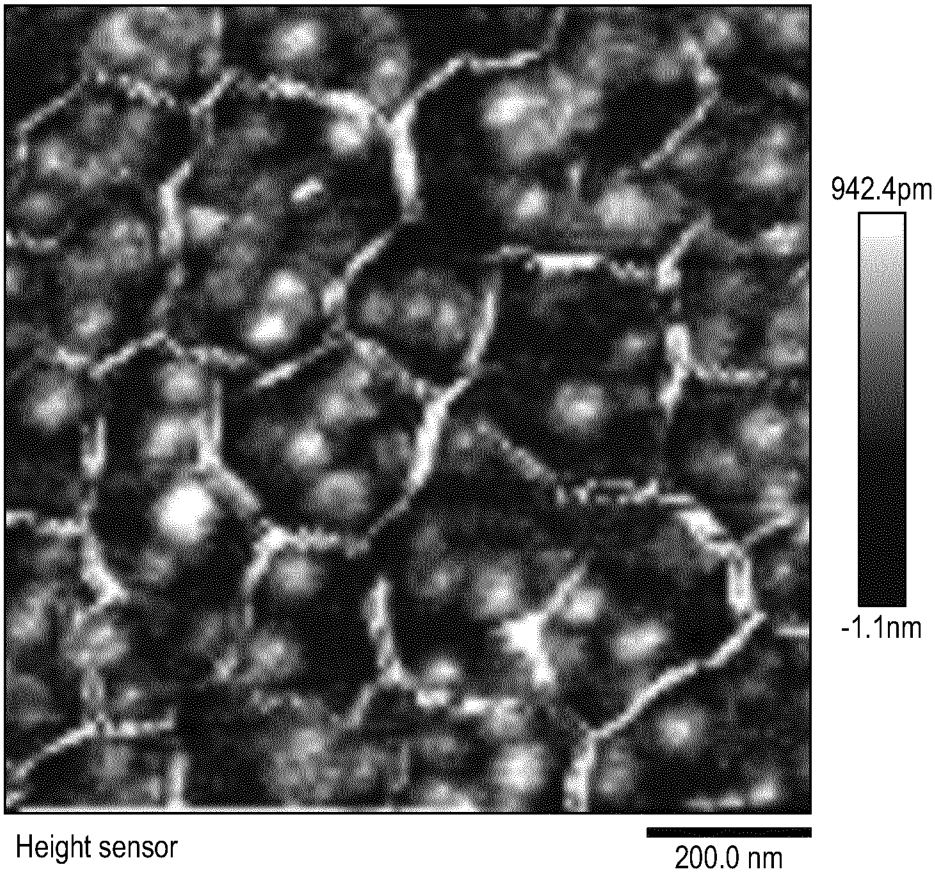
FIG. 5B is an AFM image of the graphene on $MgAl_2O_4$.
Figure 6A:
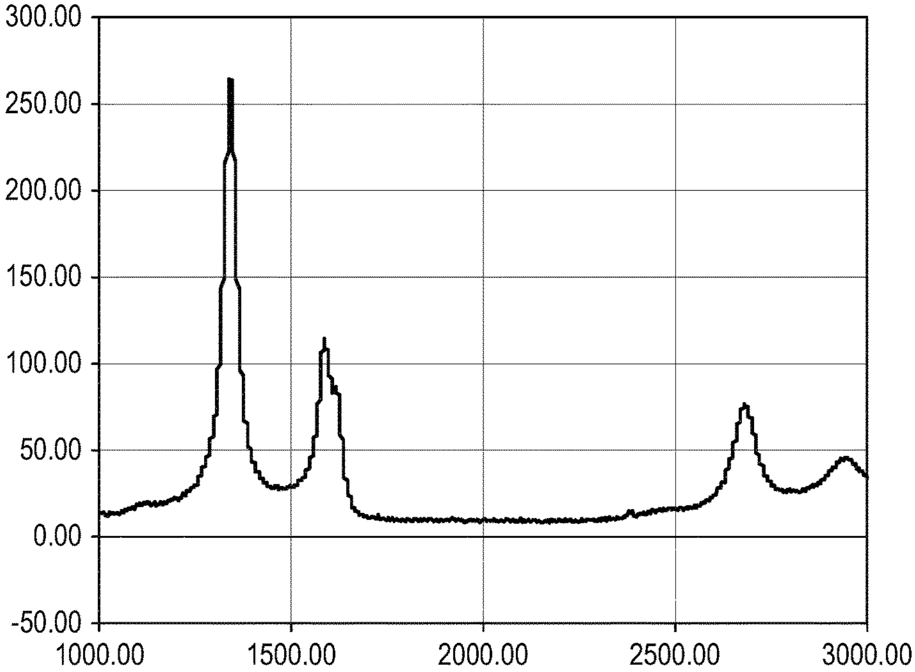
FIG. 6A is a Raman spectrum of graphene grown on a substrate having an MgO growth surface.
Figure 6B:
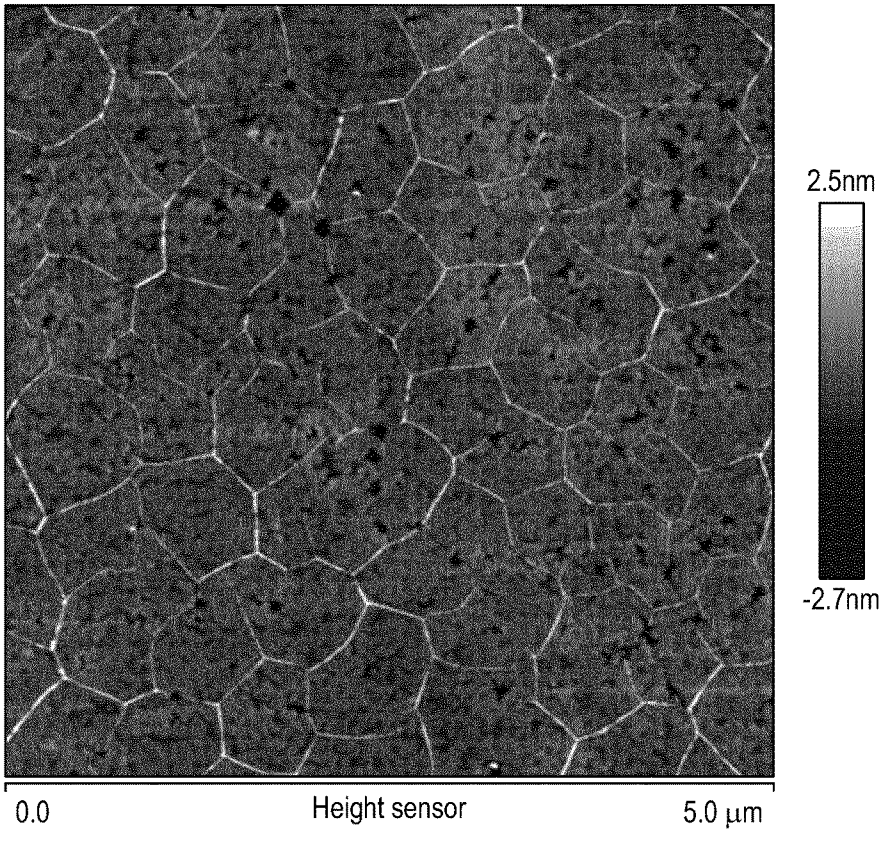
FIG. 6B is an AFM image of the graphene on MgO.
Figure 7:
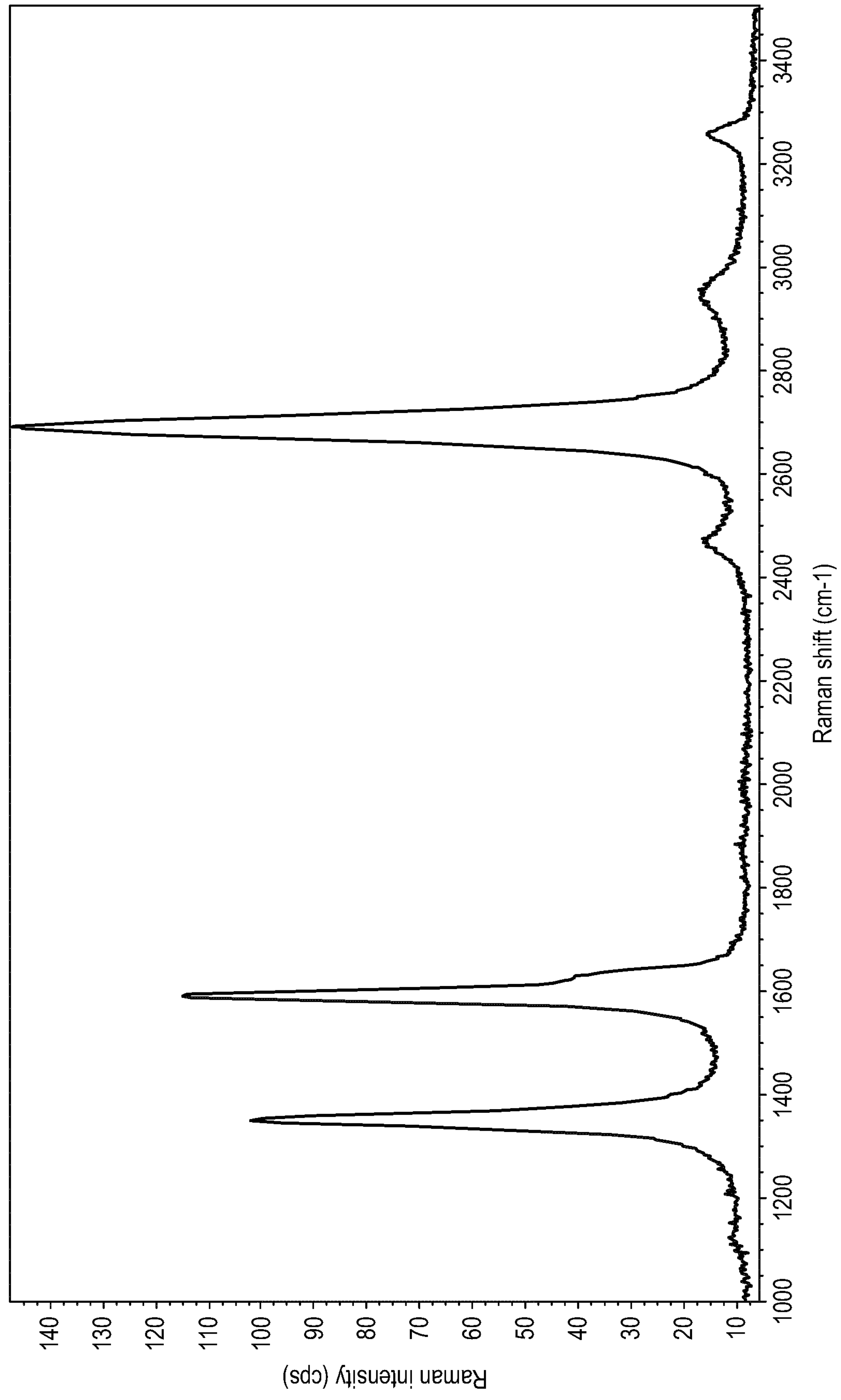
FIG. 7 is a Raman spectrum of graphene grown on a substrate having an $LaF_3$ growth surface.
Figure 8A:
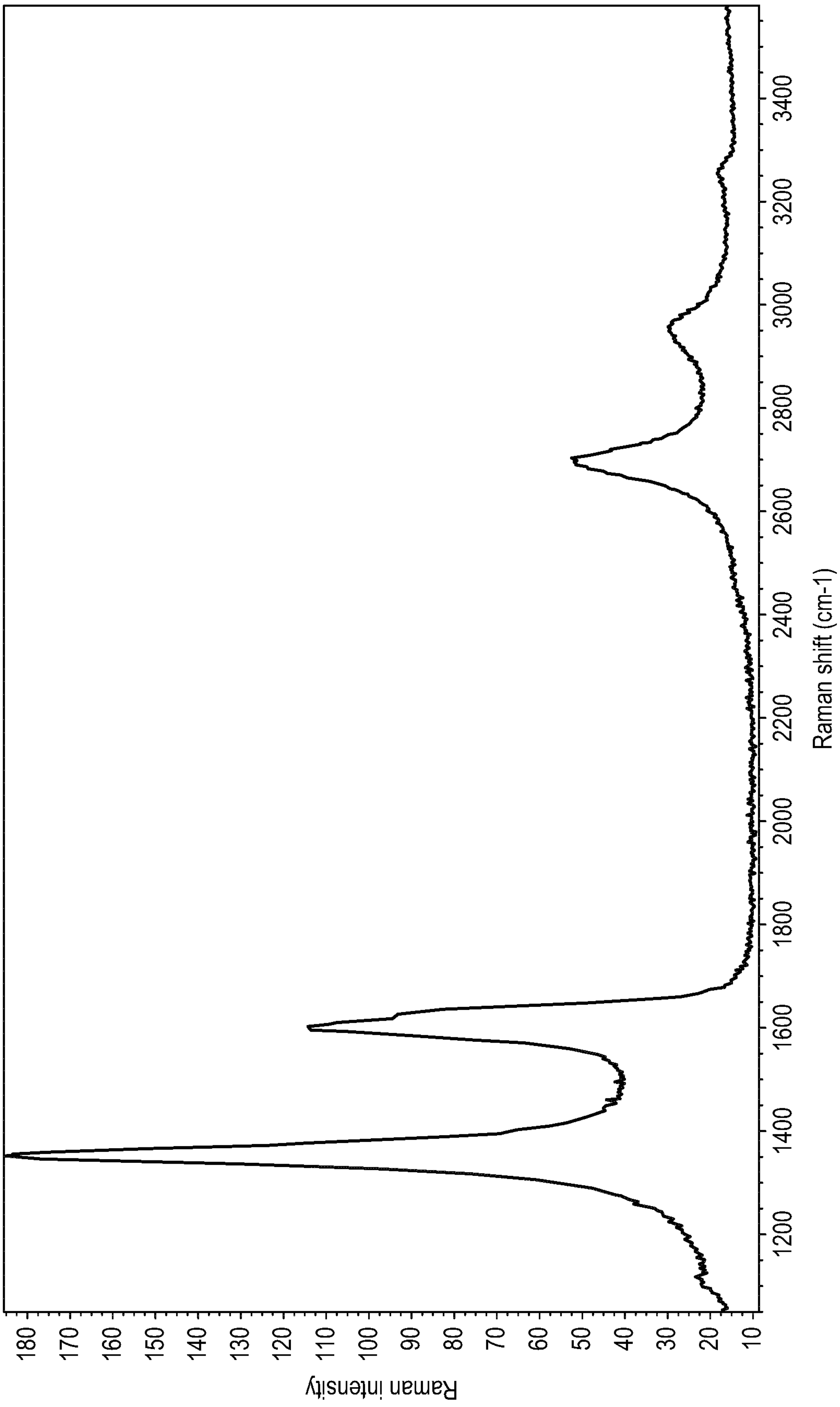
FIG. 8A is a Raman spectrum of graphene grown on a substrate having a YAG growth surface.
Figure 8B:
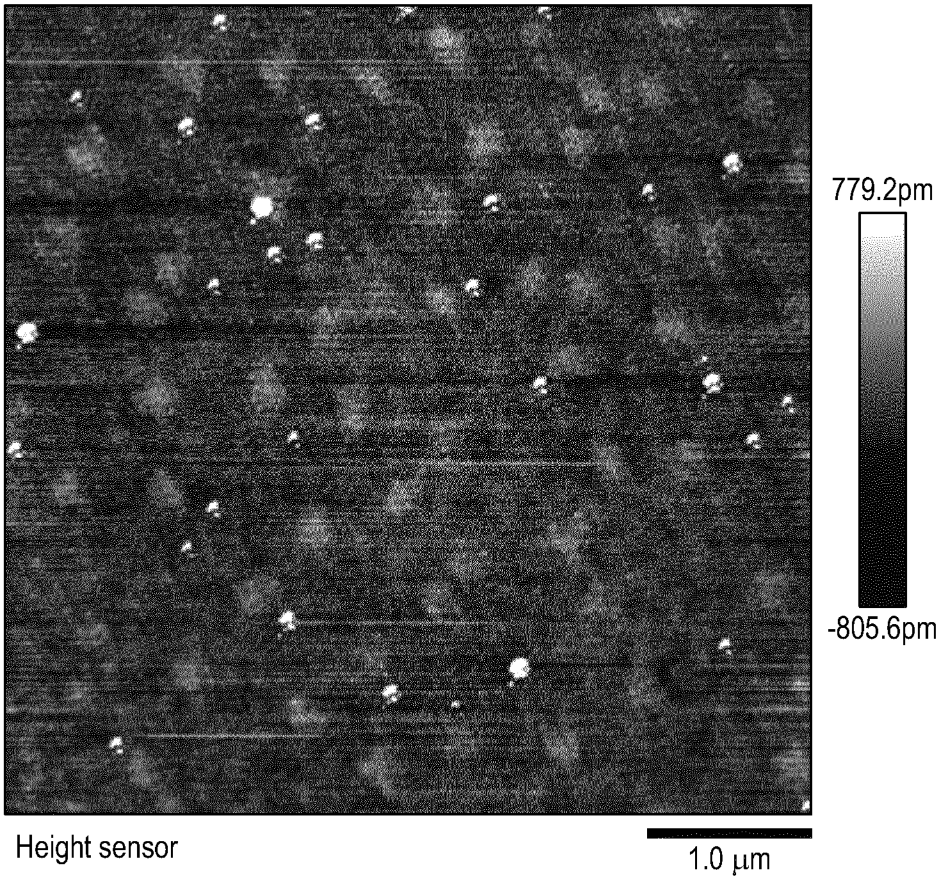
FIG. 8B is an AFM image of the graphene on YAG.

A substrate is positioned upon a silicon carbide-coated graphite susceptor within an MOCVD reactor chamber. The reactor chamber itself is protected in an inert atmosphere within a glovebox. The reactor is then sealed closed using a vacuum cavity which separates the reactor interior from the glovebox ambient by a double O-ring. The reactor is purged under a flow of nitrogen, argon or hydrogen gas at a rate of 10,000 to 60,000 sccm. The susceptor is rotated at a rate of 40 to 60 rpm. The pressure within the reactor chamber is reduced to 30 to 100 mbar. An optical probe is used to monitor the wafer reflectivity and temperature during growth—with the substrate still in its unheated state, it is rotated under the probe in order to establish a baseline signal. The substrate is then heated using resistive heater coils positioned beneath the susceptor to a setpoint of from 1,100 to 1,350° C. at a rate of 0.5 to 2.0 K/s. The wafers are optionally baked under flow of hydrogen gas for from 10 to 60 min, after which the ambient gas is switched to nitrogen or argon and the pressure is reduced to 30 to 50 mbar. The wafer is annealed at the growth temperature and pressure for a period of from 5 to 10 min, after which a hydrocarbon precursor is admitted to the chamber. This is transported from its liquid state in a bubbler by passing a carrier gas (nitrogen, argon or hydrogen) through the liquid which is held under constant temperature and pressure. The vapour enters a gas mixing manifold and proceeds to the reactor chamber through a showerhead via a multitude of small inlets commonly referred to in the art as plenums/plena, which guarantees uniform vapour distribution and growth across the growth surface. The substrate is exposed to the hydrocarbon vapour under constant flow, pressure and temperature for a duration of 1,800 to 10,800 s at which point the precursor supply valve is shut off. The substrate is then cooled under continuing flow of nitrogen, argon or hydrogen gas at a rate of from 2 to 4 K/min. Once the substrate temperature reaches below 200° C., the chamber is pumped to vacuum and purged with inert gas. The rotation is stopped and the heaters are shut off. The reactor chamber is opened and the graphene substrate is removed from the susceptor once the heater temperature reaches below 150° C.

The table below provides Raman data of various graphene substrates.

| Substrate/Precursor | A(D)/ A(G) | A(2D)/ A(G) | $G_{FWHM}$ ($cm^{-1}$) | $D_{FWHM}$ ($cm^{-1}$) |
|---|---|---|---|---|
| YSZ/n-hexane | 0.13 | 4.27 | 13.5 | 25.7 |
| Sapphire C-plane on-axis/n-hexane | 0.43 | 2.40 | 15.8 | 52.7 |
| Sapphire C-plane miscut/n-hexane | 0.63 | 2.54 | 18.1 | 43.5 |
| Sapphire R-plane/ 2,2,3-trimethylbutane | 0.82 | 4.52 | 19.3 | 20.9 |

The present example demonstrates the particularly advantageously low A(D)/A(G) ratio observed for monolayer graphene manufactured on a growth surface in accordance with the present invention. Similarly, the inventors observed an advantageously low $G_{FWHM}$ (full width at half maximum of the Raman G peak) even when compared to growth of graphene using substrates and precursor known in the Applicant's own prior art (R-plane sapphire substrates and 2,2,3-trimethylbutane) to improve quality of CVD grown graphene.

Further experiments were conducted for graphene growth on $MgAl_2O_4$, $YAlO_3$, $SrTiO_3$, MgO, $CaF_2$, $LaF_3$ and $Y_3Al_5O_{12}$. The inventors found that sheet resistances of 700Ω/□ (Ohm/sq) and lower can be achieved. Graphene grown on $CaF_2$ was observed to have a sheet resistance of less than 600Ω/□. Additionally, graphene may be grown on $CaF_2$ at substantially reduced temperatures due to significantly enhanced mass transport mobility of carbon species during growth compared with oxide surfaces such as sapphire. Growth surfaces such as $MgAl_2O_4$ have the advantage of providing a particularly low roughness. The inventors have found that $YAlO_3$ can provide the graphene with a charge transport anisotropy due to the thermal expansion anisotropy of the growth surface. Accordingly, the inventors have found that each of the growth surfaces provide particular advantages for the formation of graphene by CVD. Various Raman and AFM data for the graphene obtained on these growth surfaces is shown in FIGS. 1A to 8B.

It was found that graphene grown directly on these growth surfaces (in particular YSZ, $MgAl_2O_4$, $YAlO_3$, $CaF_2$ and $LaF_3$) formed without undesirable carbon dissolution into the growth surface during growth and with a reduction in the formation of covalent bonds between the graphene and growth surface which otherwise result in graphene defects. Accordingly, such surfaces are particularly suitable for providing a growth surface for the growth of monolayer graphene due to the lack of carbon dissolution and subsequent precipitation of carbon either as defects or areas of multilayer graphene. Equally, the lack of covalent bonding provides for the formation of graphene rather than other carbon allotropes such as carbon nanotubes.

The inventors also investigated the influence of the substrate crystallographic orientation. The growth process was repeated for each of YSZ <100>, <110> and <111> and growth was halted prior to complete formation of a graphene monolayer. The "step height" of the graphene grain edges were measured by AFM. That is, the difference in height between the substrate surface and the adjacent graphene surface was measured, and the results provided in the table below.

| Substrate | Max. height | Min. height | Mean height | $A_{2D}/A_G$ (complete monolayer growth) |
|---|---|---|---|---|
| YSZ <100> | 660 nm | 330 nm | 440 nm | 3.8 |
| YSZ <110> | 370 nm | 67 nm | 210 nm | 2.6 |
| YSZ <111> | 500 nm | 490 nm | 490 nm | 4.1 |

Figure 9A:
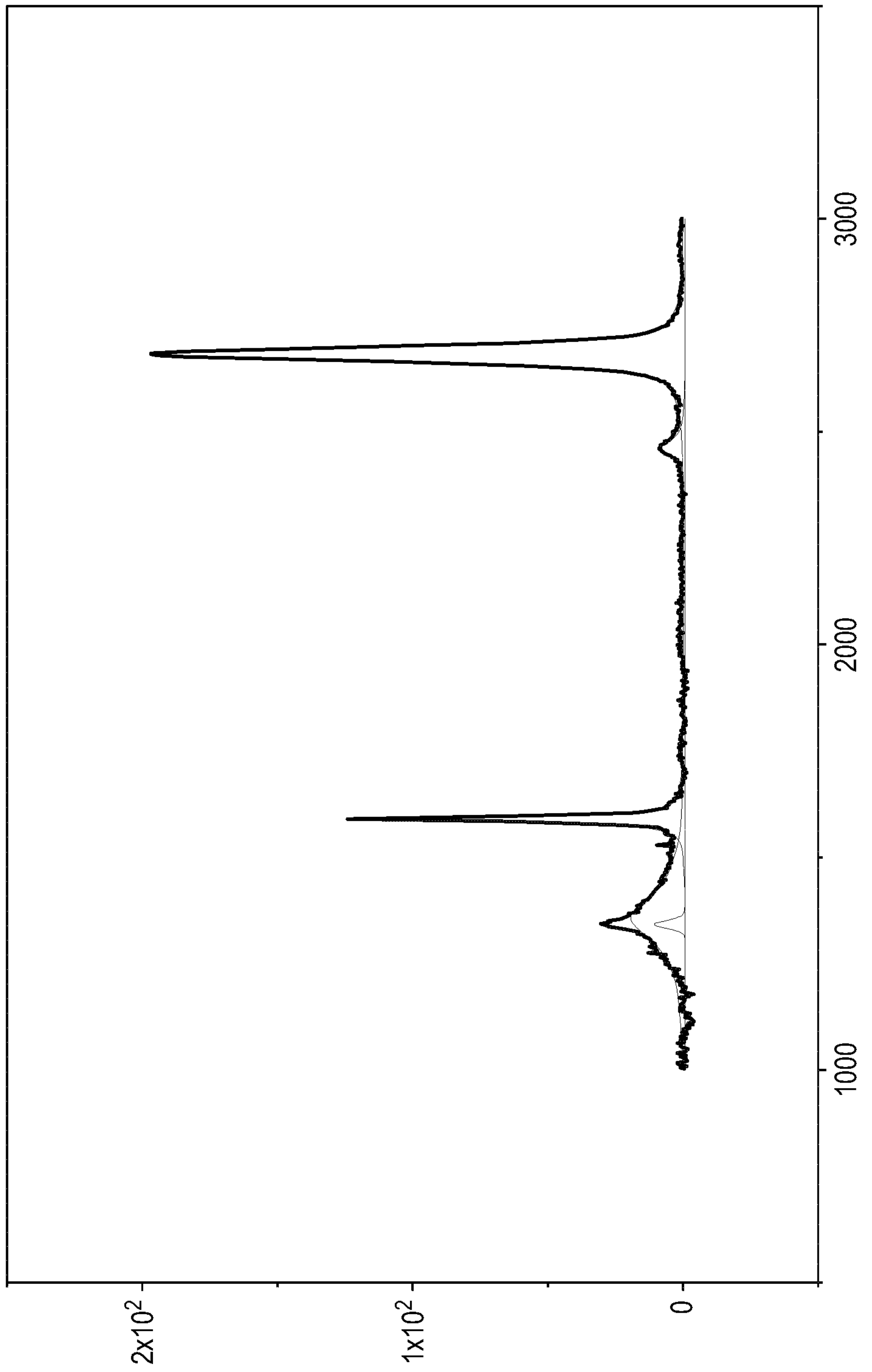
FIGS. 9A, 9B and 9C are Raman spectra of graphene grown on YSZ <100>, <110>, and <111>, respectively.
Figure 9B:
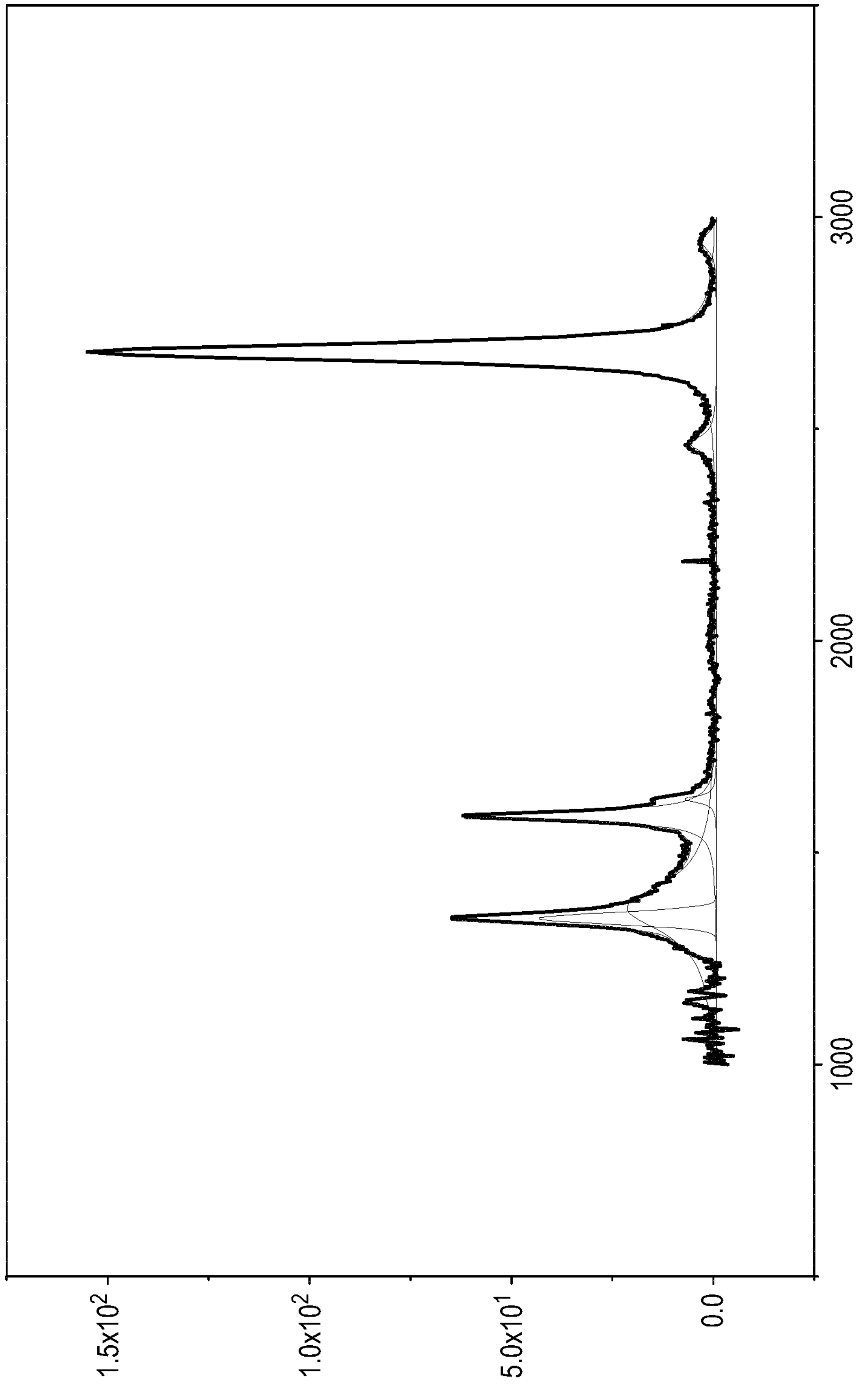
Figure 9C:
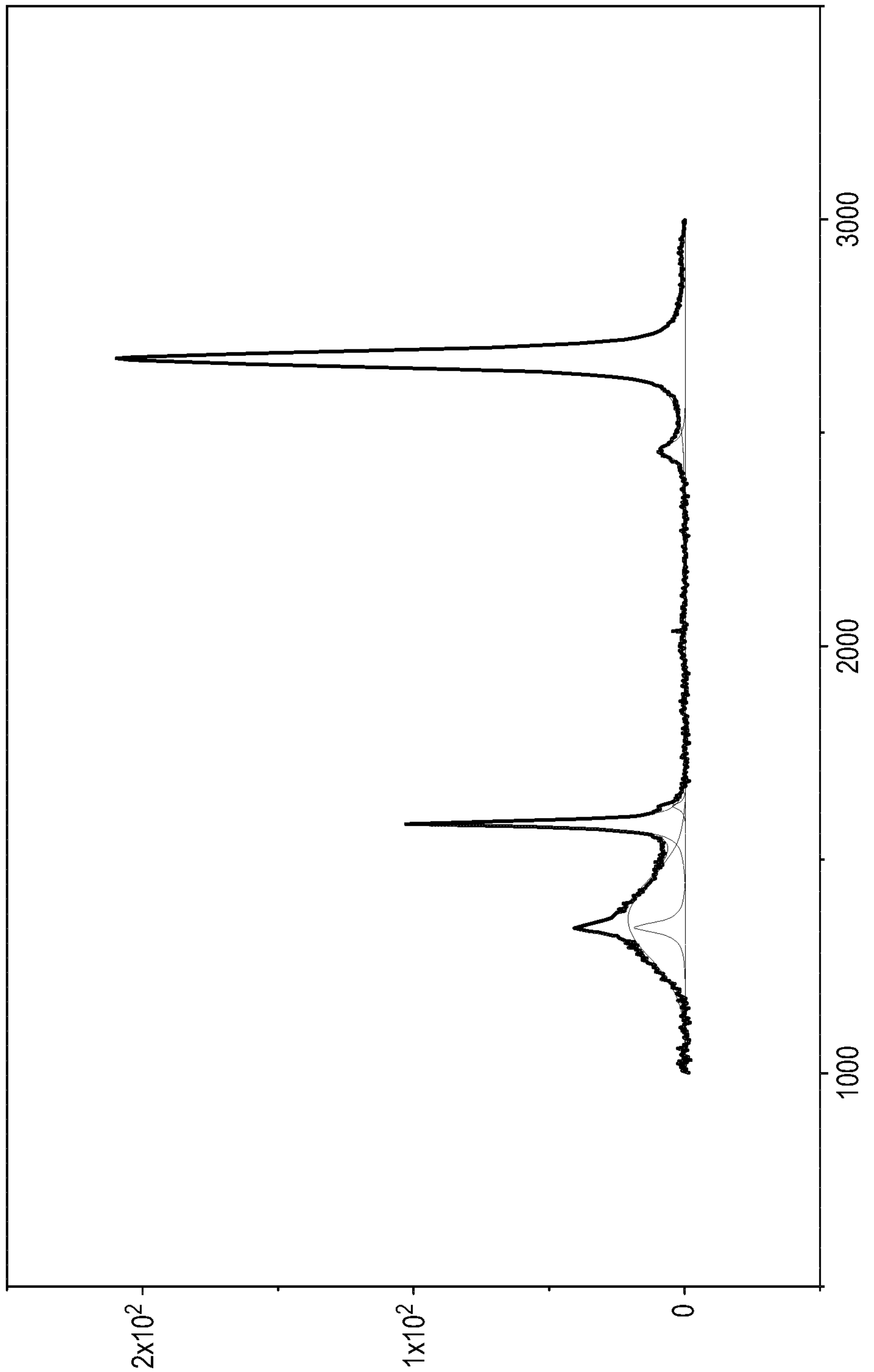
Figure 10:
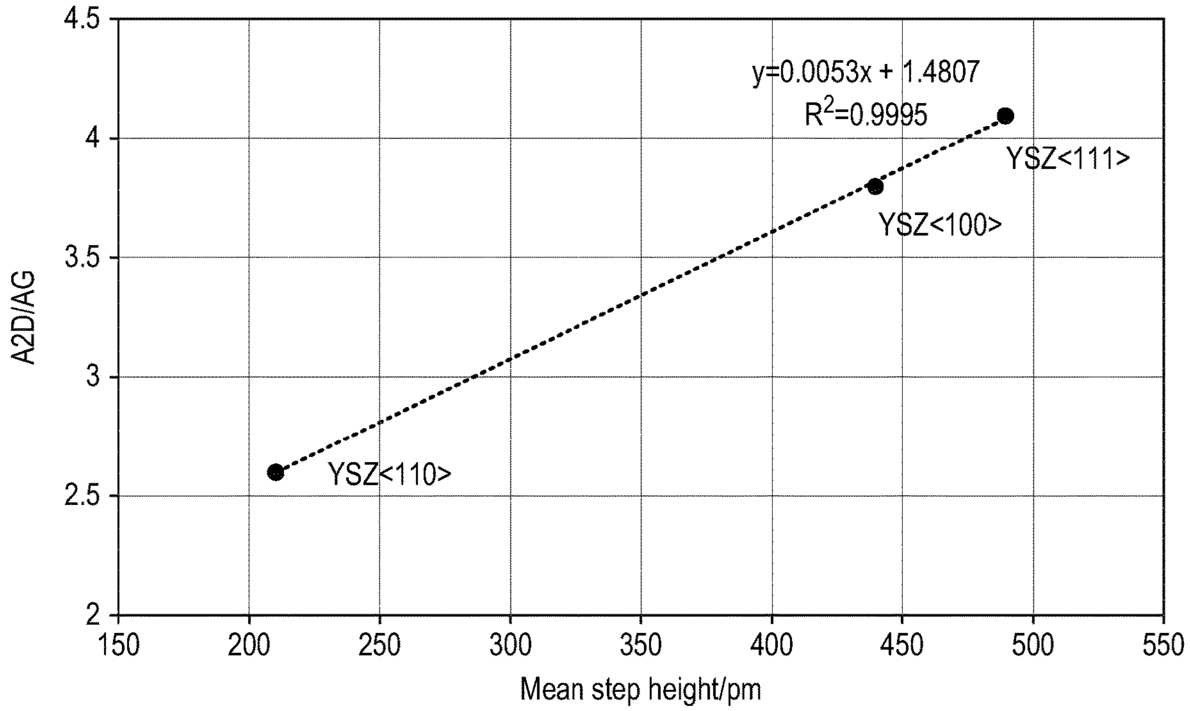
FIG. 10 is a plot of mean step height against the ratio of $A_{2D}/A_G$ for graphene grown on YSZ <100>, <110>, and <111>.

The results are also plotted in FIG. 10 demonstrating the strong correlation between mean step height and the resulting $A_{2D}/A_G$ ratio. That is, the inventors were surprised to find that different orientations gave rise to different strengths of interaction with the graphene thereon. YSZ <111> was found to have the least interaction with the graphene as evidence by the greatest mean change in height which in turn resulted in graphene having a higher $A_{2D}/A_G$ ratio. The Raman spectra of the graphene after complete monolayer growth on each substrate are shown in FIGS. 9A to 9C.

Figure 11:
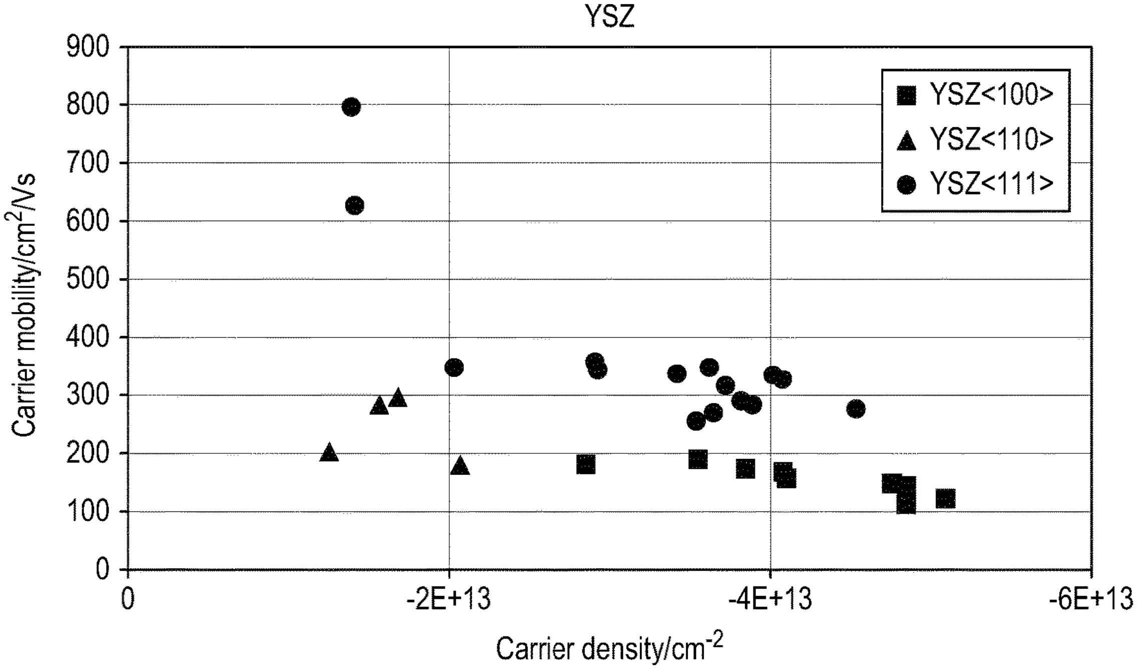
FIG. 11 is a plot of the carrier densities against mobility obtained for graphene grown on YSZ <100>, <11>, and <111>.

The inventors also investigated the resulting electronic properties of the graphene grown on each of the crystal orientations and were equally surprised to find that there were distinct differences. As shown by the plot in FIG. 11 of carrier density ($cm^{-2}$) against mobility ($cm^2/Vs$), YSZ <111> consistently gave rise to higher carrier mobilities across a range of carrier densities. YSZ <100> gave rise to consistently larger carrier densities compared to YSZ <110>.

Figure 12A:
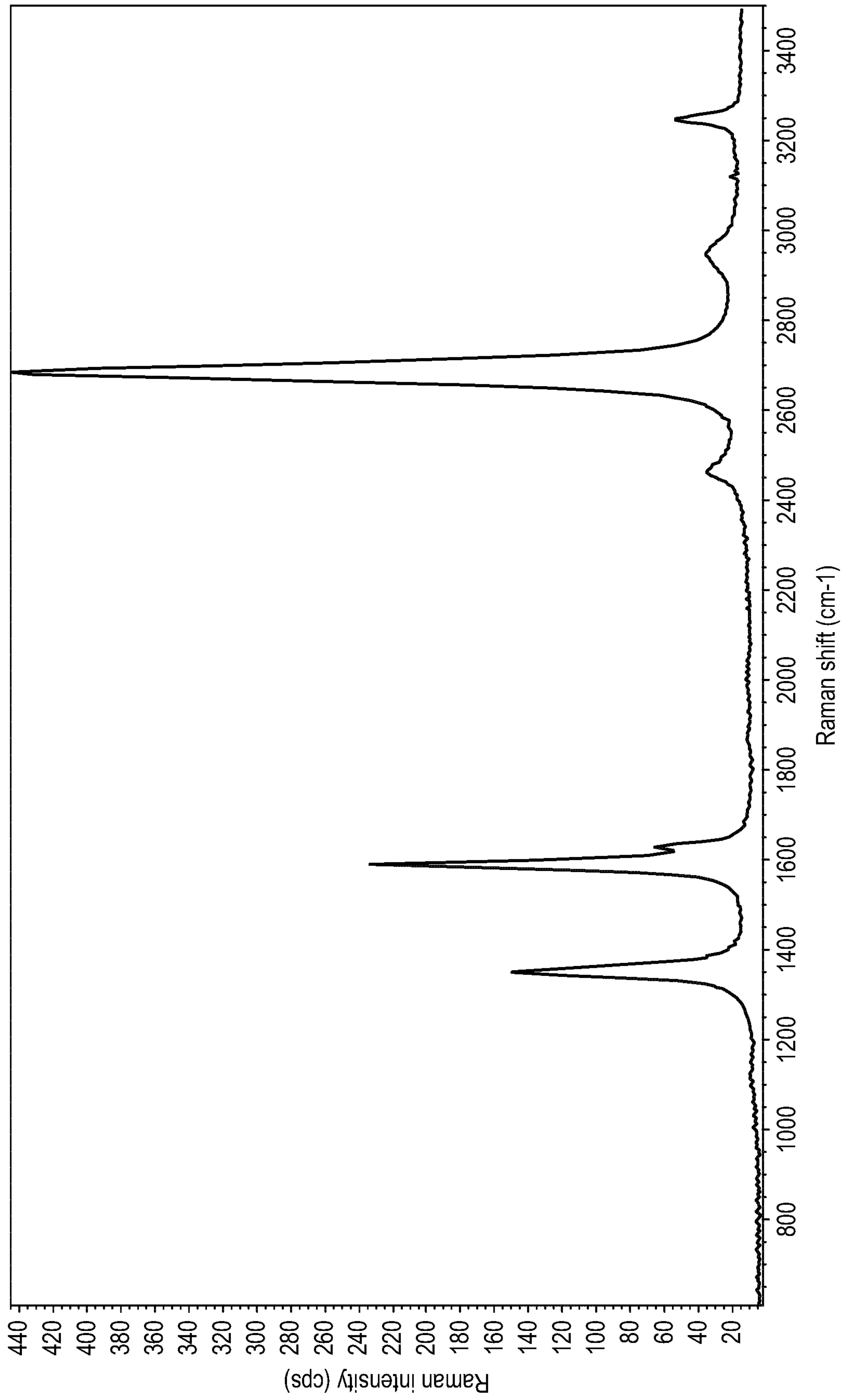
FIG. 12A is a Raman spectrum of graphene grown on $CaF_2$ <111>.
Figure 12B:
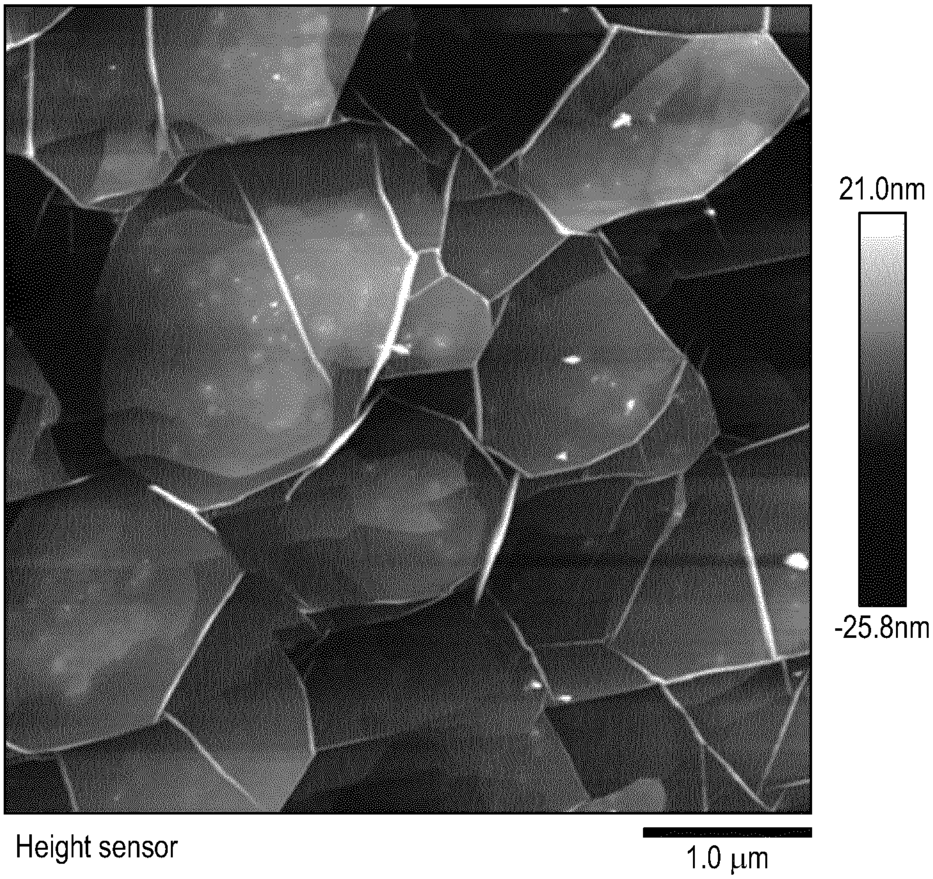
FIG. 12B is an AFM image of the graphene on $CaF_2$ <111>.
Figure 13A:
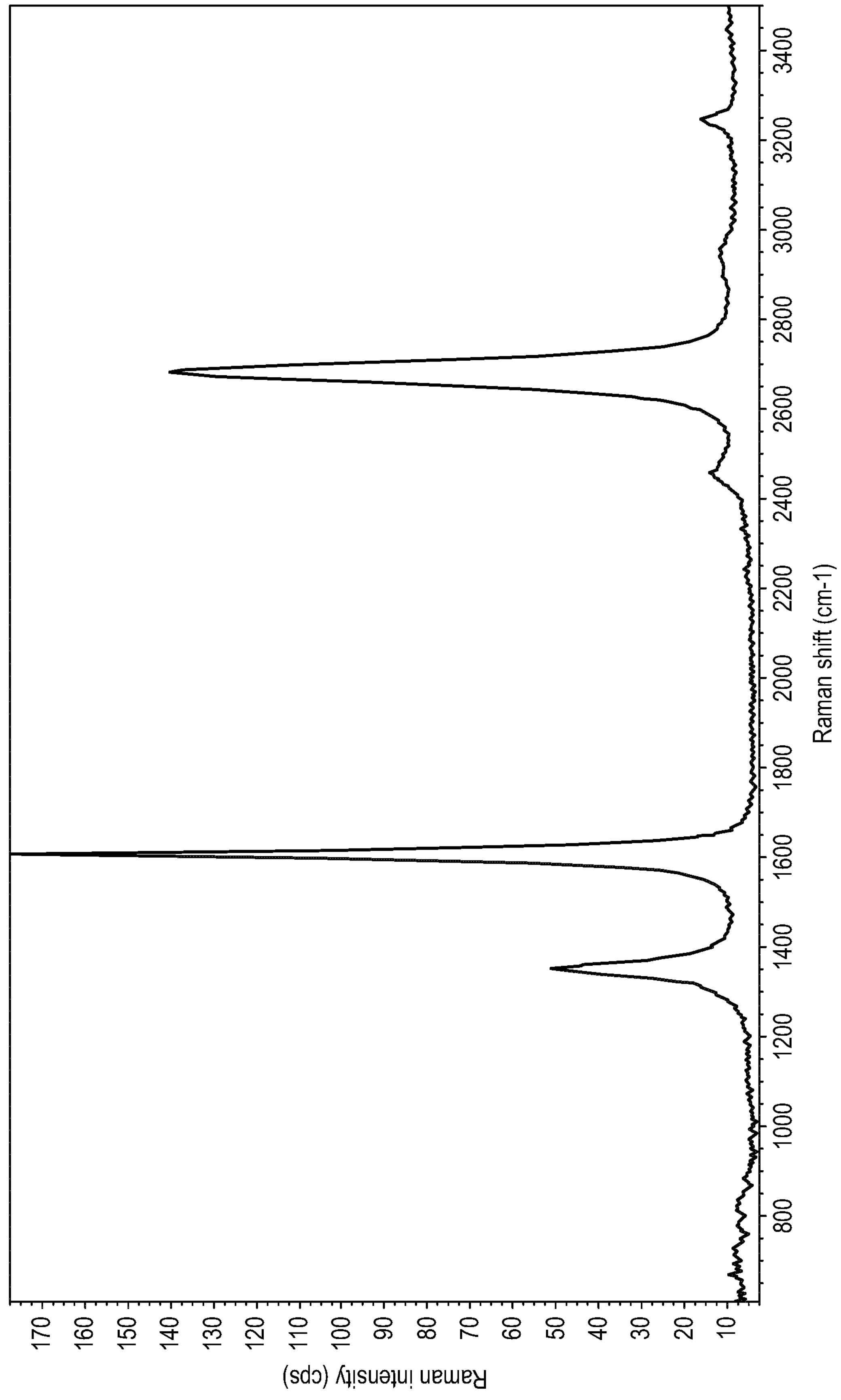
FIG. 13A is a Raman spectrum of graphene grown on $CaF_2$ <100>.
Figure 13B:
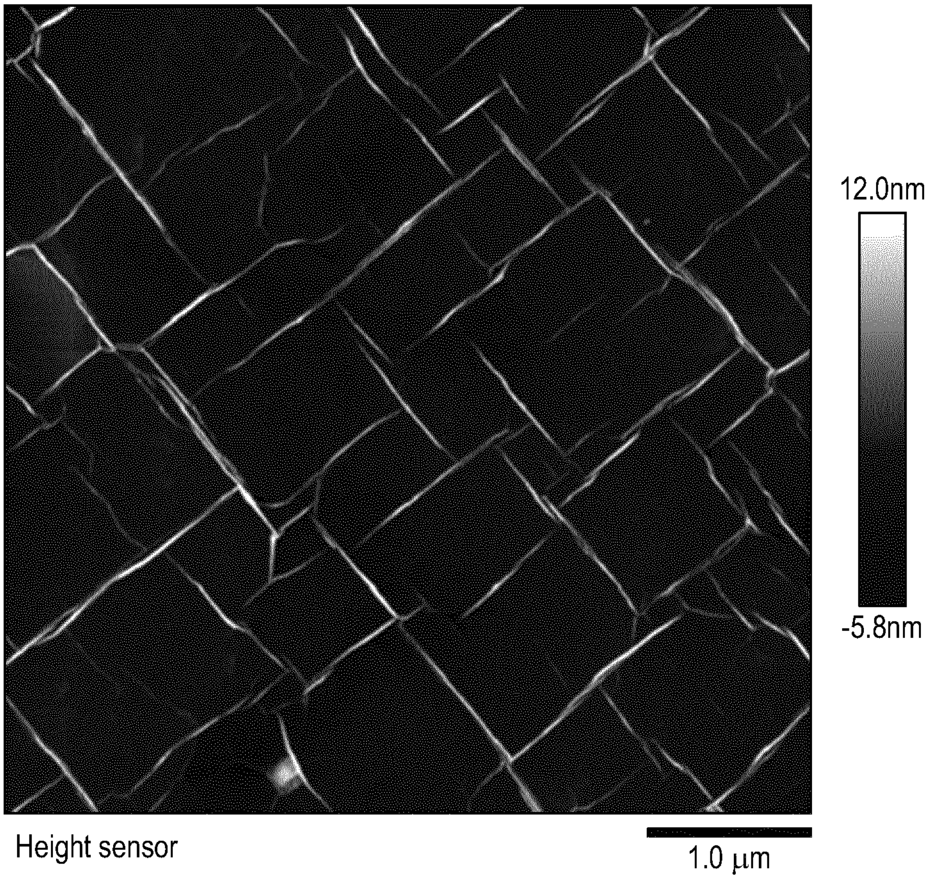
FIG. 13B is an AFM image of the graphene on $CaF_2$ <100>.
Figure 14A:
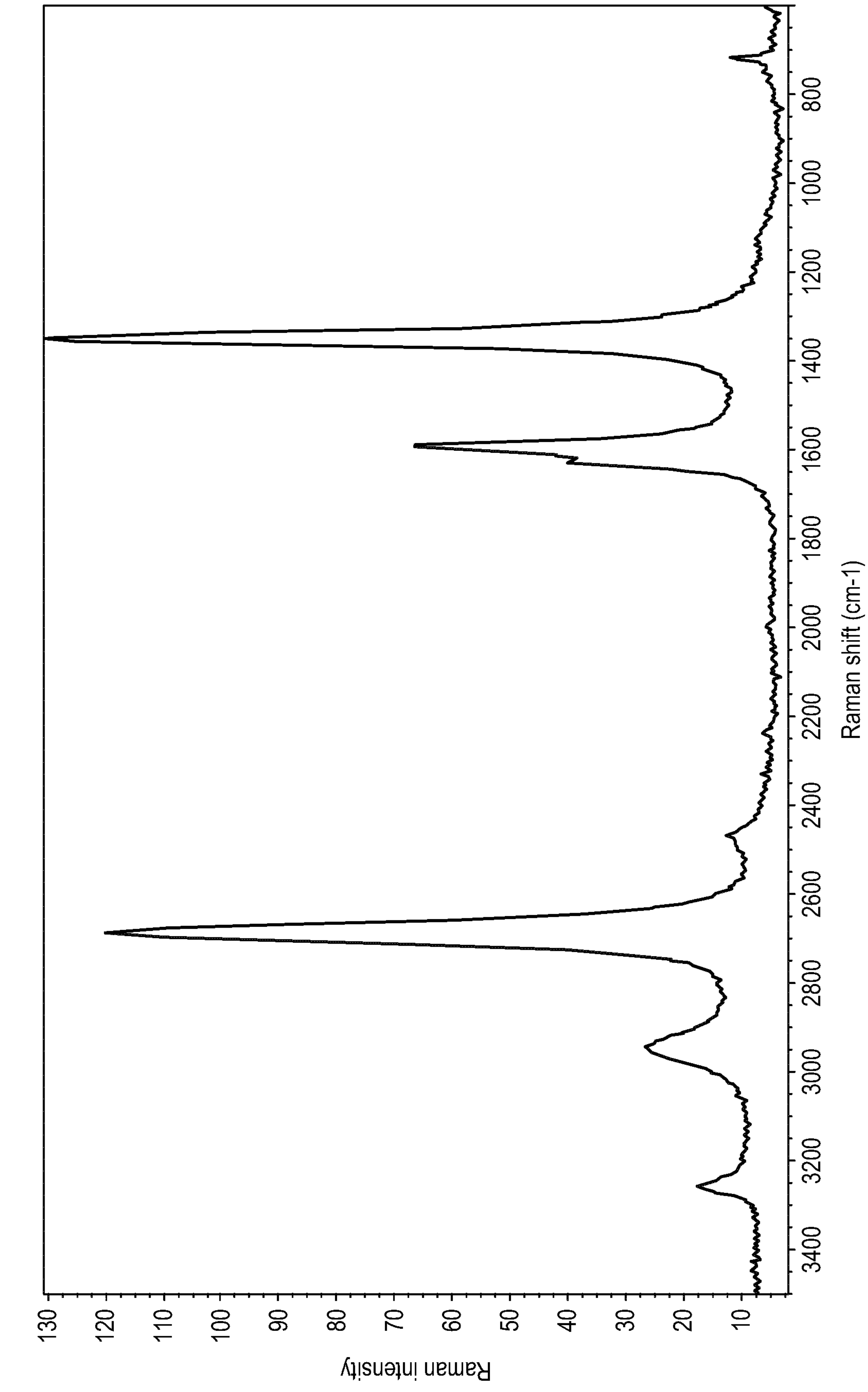
FIG. 14A is a Raman spectrum of graphene grown on $CaF_2$ <110>.
Figure 14B:
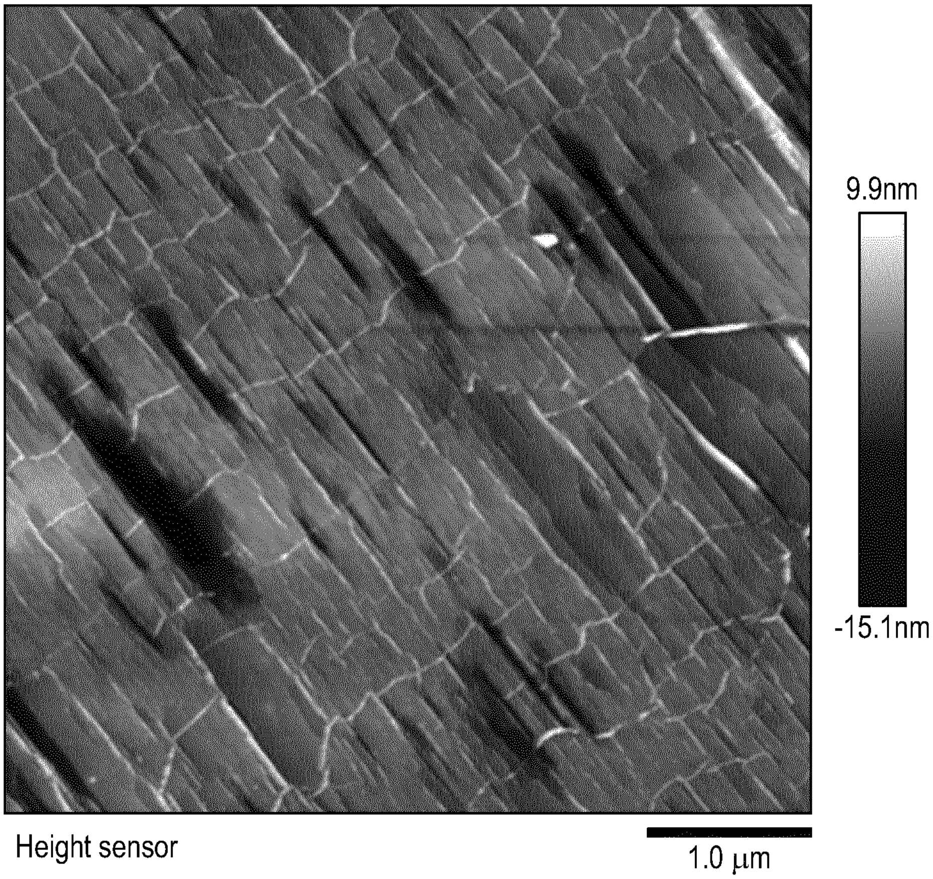
FIG. 14B is an AFM image of the graphene on $CaF_2$ <110>.

The inventors also investigated the influence of $CaF_2$ crystallographic orientation. The growth process was repeated for $CaF_2$ <111>, <100>, and <110>, the resulting data for which is shown in FIGS. 12A and B, 13A and B, and 14A and B, respectively, and the following table.

| | $CaF_2$ <111> | $CaF_2$ <100> | $CaF_2$ <110> |
|---|---|---|---|
| Sheet resistance (Ω/□) | 6830 | 165 | 2875 |
| Charge carrier density ($cm^{-2}$) | $4.12 \times 10^{12}$ | $-3.5 \times 10^{13}$ | $-7.4 \times 10^{13}$ |
| Carrier mobility ($cm^2/Vs$) | 220 | 1100 | 30 |
| D/G | 0.80 | 0.22 | 2.17 |
| 2D/G | 3.4 | 1.9 | 2.50 |

The inventors were surprised to find that the different orientations gave rise to different doping types in the graphene grown thereon as evidence by the charge carrier density. It is also particularly unexpected that whilst less "substrate interaction" was observed when grown in $CaF_2$ as shown by the larger $A_{2D}/A_G$ ratio, a higher defect density was also observed such that $CaF_2$ <100> gave rise to graphene have improved electrical properties over <111>.

As used herein, the singular form of "a", "an" and "the" include plural references unless the context clearly dictates otherwise. The use of the term "comprising" is intended to be interpreted as including such features but not excluding other features and is also intended to include the option of the features necessarily being limited to those described. In other words, the term also includes the limitations of "consisting essentially of" (intended to mean that specific further components can be present provided they do not materially affect the essential characteristic of the described feature) and "consisting of" (intended to mean that no other feature may be included such that if the components were expressed as percentages by their proportions, these would add up to 100%, whilst accounting for any unavoidable impurities), unless the context clearly dictates otherwise.

The foregoing detailed description has been provided by way of explanation and illustration, and is not intended to limit the scope of the appended claims. Many variations of the presently preferred embodiments illustrated herein will be apparent to one of ordinary skill in the art, and remain within the scope of the appended claims and their equivalents.

The invention claimed is:

1. A method of forming a graphene layer structure, the method comprising:

providing a growth substrate having a growth surface; and forming a graphene layer structure on the growth surface by CVD;

wherein the growth surface is formed of a material selected from the group consisting of:

yttrium stabilized zirconia and $MgAl_2O_4$.

2. The method according to claim 1, wherein the growth surface is formed of yttrium stabilized zirconia.

3. The method according to claim 2, wherein the growth surface is formed of yttrium stabilized zirconia having a crystallographic orientation of <100>, <110>, or <111>.

4. The method according to claim 1, wherein the growth surface is formed of $MgAl_2O_4$.

5. The method according to claim 1, wherein the growth substrate further comprises a support layer.

6. The method according to claim 5, wherein the support layer comprises sapphire or silicon.

7. The method according to claim 1, wherein the temperature of the growth surface during CVD is from 700° C. to 1350° C.

8. The method according to claim 1, wherein forming the graphene layer structure on the growth surface by CVD comprises:

providing the growth substrate on a heated susceptor in a close-coupled reaction chamber, the close-coupled reaction chamber having a plurality of cooled inlets arranged so that, in use, the inlets are distributed across the growth surface and have constant separation from the substrate;

cooling the inlets to less than 100° C.;

introducing a carbon-containing precursor in a gas phase and/or suspended in a gas through the inlets and into the close-coupled reaction chamber; and heating the susceptor to achieve a growth surface temperature of at least 50° C. in excess of a decomposition temperature of the precursor, to provide a thermal gradient between the substrate surface and inlets that is sufficiently steep to allow the formation of graphene from carbon released from the decomposed precursor;

wherein the constant separation is less than 100 mm.

9. The method according to claim 8, wherein the constant separation is less than 25 mm.

10. The method according to claim 8, wherein the constant separation is less than 10 mm.

11. A graphene substrate comprising:

a CVD-grown graphene layer structure grown directly on a first layer, wherein the first layer is formed of $MgAl_2O_4$; or wherein the first layer is formed of yttrium stabilized zirconia having a crystallographic orientation of <100> or <111>, and wherein the ratio $A_{2D}/A_G$ of the graphene layer structure as measured by Raman spectroscopy is greater than 3.

12. The graphene substrate according to claim 11, wherein the first layer is formed of yttrium stabilized zirconia having a crystallographic orientation of <100> or <111>, wherein the ratio $A_{2D}/A_G$ of the graphene layer structure as measured by Raman spectroscopy is greater than 3.

13. The graphene substrate according to claim 11, wherein the first layer is directly on a support layer.

14. The graphene substrate according to claim 13, wherein the support layer comprises sapphire or silicon.

15. The graphene substrate according to claim 11, wherein the graphene substrate is prepared according to a method comprising:

providing a growth substrate having a growth surface; and forming a graphene layer structure on the growth surface by CVD;

wherein the growth surface is formed of a material selected from the group consisting of:

yttrium stabilized zirconia and $MgAl_2O_4$.

16. The graphene substrate according to claim 11, wherein the first layer is formed of $MgAl_2O_4$.

17. An electrical device comprising the graphene substrate according to claim 11.

18. A method of forming a graphene layer structure, the method comprising:

providing a growth substrate having a growth surface; and forming a graphene layer structure on the growth surface by CVD;

wherein the growth surface is formed of a material selected from the group consisting of: yttrium stabilized zirconia, $MgAl_2O_4$, $YAlO_3$, $MgF_2$ and $LaF_3$;

wherein forming the graphene layer structure on the growth surface by CVD comprises:

providing the growth substrate on a heated susceptor in a close-coupled reaction chamber, the close-coupled reaction chamber having a plurality of cooled inlets arranged so that, in use, the inlets are distributed across the growth surface and have constant separation from the substrate;

cooling the inlets to less than 100° C.;

introducing a carbon-containing precursor in a gas phase and/or suspended in a gas through the inlets and into the close-coupled reaction chamber; and heating the susceptor to achieve a growth surface temperature of at least 50° C. in excess of a decomposition temperature of the precursor, to provide a thermal gradient between the substrate surface and inlets that is sufficiently steep to allow the formation of graphene from carbon released from the decomposed precursor;

wherein the constant separation is less than 100 mm.

19. The method according to claim 18, wherein the constant separation is less than 25 mm.

20. The method according to claim 18, wherein the constant separation is less than 10 mm.

* * * * *